United States Patent
Zhang et al.

(10) Patent No.: US 10,063,458 B2
(45) Date of Patent: Aug. 28, 2018

(54) ASYMMETRIC CONNECTION WITH EXTERNAL NETWORKS

(71) Applicant: Nicira, Inc., Palo Alto, CA (US)

(72) Inventors: Ronghua Zhang, San Jose, CA (US); Jesse E. Gross, IV, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 907 days.

(21) Appl. No.: 14/068,658

(22) Filed: Oct. 31, 2013

(65) Prior Publication Data

US 2015/0103838 A1 Apr. 16, 2015

Related U.S. Application Data

(60) Provisional application No. 61/890,314, filed on Oct. 13, 2013.

(51) Int. Cl.
*H04L 29/06* (2006.01)
*H04L 12/715* (2013.01)
(Continued)

(52) U.S. Cl.
CPC ............ *H04L 45/04* (2013.01); *H04L 12/467* (2013.01); *H04L 45/38* (2013.01); *H04L 45/60* (2013.01);
(Continued)

(58) Field of Classification Search
CPC ......... H04L 41/12; H04L 49/70; H04L 12/66; H04L 45/586; H04L 43/08; H04L 12/467;
(Continued)

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

EP 1653688 5/2006
EP 2860919 4/2015
(Continued)

OTHER PUBLICATIONS

Casado et al., "Virtualizing the Network Forwarding Plane", Dec. 2010 (Year: 2010).*
(Continued)

*Primary Examiner* — Salvador E Rivas
(74) *Attorney, Agent, or Firm* — Adeli LLP

(57) ABSTRACT

Some embodiments provide a system that allows for the use of direct host return ports (abbreviated "DHR ports") on managed forwarding elements to bypass gateways in managed networks. The DHR ports provide a direct connection from certain managed forwarding elements in the managed network to remote destinations that are external to the managed network. Managed networks can include both a logical abstraction layer and physical machine layer. At the logical abstraction layer, the DHR port is treated as a port on certain logical forwarding elements. The DHR port transmits the packet to the routing tables of the physical layer machine that hosts the logical forwarding element without any intervening transmission to other logical forwarding elements. The routing tables of the physical layer machine then strip any logical context associated with a packet and forwarding the packet to the remote destination without any intervening forwarding to a physical gateway provider.

21 Claims, 10 Drawing Sheets

(51) Int. Cl.
  *H04L 12/46* (2006.01)
  *H04L 12/773* (2013.01)
  *H04L 12/721* (2013.01)
  *H04L 12/741* (2013.01)
  *H04L 12/931* (2013.01)
  *H04Q 11/00* (2006.01)

(52) U.S. Cl.
  CPC ............ *H04L 45/74* (2013.01); *H04L 49/351* (2013.01); *H04L 63/0236* (2013.01); *H04L 45/64* (2013.01); *H04Q 11/0005* (2013.01)

(58) Field of Classification Search
  CPC .. H04L 63/0236; H04L 45/60; H04Q 11/0005
  See application file for complete search history.

(56) References Cited

U.S. PATENT DOCUMENTS

| | | |
|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,059,999 B2 | 6/2015 | Koponen et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0225857 A1* | 12/2003 | Flynn .................... G06Q 40/06 709/217 |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |

(56) References Cited

U.S. PATENT DOCUMENTS

| | | |
|---|---|---|
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1* | 7/2010 | McDysan ........... H04L 63/0272 726/15 |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0145390 A1 | 6/2011 | Kakadia et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0039338 A1 | 2/2012 | Morimoto |
| 2012/0131643 A1 | 5/2012 | Cheriton |
| 2012/0173757 A1* | 7/2012 | Sanden ................ H04L 45/586 709/238 |
| 2012/0182992 A1 | 7/2012 | Cowart et al. |
| 2012/0236734 A1 | 9/2012 | Sampath et al. |
| 2012/0278802 A1* | 11/2012 | Nilakantan ......... G06F 9/45558 718/1 |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0058346 A1* | 3/2013 | Sridharan ............ H04L 45/586 370/392 |
| 2013/0142048 A1 | 6/2013 | Gross et al. |
| 2013/0145002 A1* | 6/2013 | Kannan ................ H04L 45/586 709/223 |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2018/0063231 A1 | 3/2018 | Park |

FOREIGN PATENT DOCUMENTS

| | | |
|---|---|---|
| JP | 2003-069609 | 3/2003 |
| JP | 2003-124976 | 4/2003 |
| JP | 2003-318949 | 11/2003 |
| WO | WO 2005/112390 | 11/2005 |
| WO | WO 2008/095010 | 8/2008 |

OTHER PUBLICATIONS

Portions of prosecution history of EP14184270.8, dated Apr. 20, 2015, Nicira, Inc.

Agarwal, Sugam, et al., "Traffic Engineering in Software Defined Networks," 2013 Proceedings IEEE INFOCOM, Apr. 14, 2013, pp. 2211-2219, Bell Labs, Alcatel-Lucent, Holmdel, NJ, USA.

Aggarwal, R., et al., "Data Center Mobility based on E-VPN, BGP/MPLS IP VPN, IP Routing and NHRP; draft-raggarwa-data-center-mobility-05.txt," Jun. 10, 2013, pp. 1-24, Internet Engineering Task Force, IETF, Standardworkingdraft, Internet Society (ISOC) 4, Rue Des Falaises CH-1205 Geneva, Switzerland.

Al-Fares, Mohammad, et al., "A Scalable, Commodity Data Center Network Architecture," Aug. 17-22, 2008, pp. 63-74, Seattle, Washington, USA.

Andersen, David, et al., "Resilient Overlay Networks," Oct. 2001, 15 pages, 18th ACM Symp. on Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, pp. 1-8, VISA'09, Barcelona, Spain, ACM.

Author Unknown , "Cisco VN-Link: Virtualization-Aware Networking," Month Unknown, 2009, 10 pages, Cisco Systems, Inc.

Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown , "HP Web Jetadmin Integration into HP OpenView Network Node Manager," Feb. 2004, pp. 1-12, HP.

Author Unknown , "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown , "Open vSwitch, An Open Virtual Switch," Dec. 30, 2010, 2 pages, Cisco Systems, Inc.

Author Unknown , "Single Root I/O Virtualization and Sharing Specification, Revision 1.0," Sep. 11, 2007, pp. 1-84, PCI-SIG.

Author Unknown , "VMware for Linux Networking Support," month unknown, 1999, 5 pp., VMware, Inc.

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unknown, 2004, pp. 1-4, Hewlett-Packard Development Company, HP.

Author Unknown, "Intel 82599 10 Gigabit Ethernet Controller: Datasheet, Revision: 2.73," Dec. 2011, 930 pages, Intel Corporation.

Author Unknown, "Introduction to VMware Infrastructure: ESX Server 3.5, ESX Server 3i version 3.5, VirtualCenter 2.5," Dec. 2007, pp. 1-46, Revision: 20071213, VMware, Inc., Palo Alto, California, USA.

(56) References Cited

OTHER PUBLICATIONS

Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," month unknown, 2008, pp. 1-6.
Casado, Martin, et al., "SANE: A Protection Architecture for Enterprise Networks," Proceedings of the 15$^{th}$ USENIX Security Symposium, Jul. 31, 2006, pp. 137-151.
Casado, Martin, et al., "Scaling Out: Network Virtualization Revisited," month unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Suarav, et al. "Simple Unified Control for Packet and Circuit Networks," Month Unknown, 2009, pp. 147-148, IEEE.
Das, Suarav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Davoli, Renzo, "VDE: Virtual Distributed Ethernet," Feb. 2005, pp. 1-8, TRIDENTCOM'05, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. (U.S. Appl. No. 61/514,990), filed Aug. 4, 2011.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.

Foster, Nate, et al., "Frenetic: A Network Programming Language," ICFP '11, Sep. 19-21, 2011, 13 pages, Tokyo, Japan.
Greenberg, Albert, et al., "A Clean Slate 4D Approach to Network Control and Management," Oct. 2005, 12 pp., vol. 35, No. 5, ACM SIGCOMM Computer Communication Review.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," Jul. 2008, pp. 105-110, vol. 38, No. 3, ACM SIGCOMM Computer communication Review.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Hamilton, James, et al., "Datacenter Networks Are in My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," month unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, pp. 1-34, vol. 18, No. 3.
Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overlays," In Proc. of SOSP, Oct. 2005, 16 pages. Brighton, UK.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, 14 pages, ACM, Portland, Oregon, USA.
Mann, Vijay, etal., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
McKeown, Nick, et al., "OpenFlow: Enabling Innovation in Campus Networks," Mar. 14, 2008, 6 pages.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben, et al., "Extending Networking into the Virtualization Layer," Proc. of HotNets, Oct. 2009, pp. 1-6.

(56) References Cited

OTHER PUBLICATIONS

Rosen, E., et al., "Applicability Statement for BGP/MPLS IP Virtual Private Networks (VPNs)," The Internet Society, RFC 4365, Feb. 2006, pp. 1-32.
Shenker, Scott, et al., "The Future of Networking, and the Past of Protocols," Dec. 2, 2011, pp. 1-30, USA.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," month unknown, 2009, 6 pp., Proceedings of HotNets.
Touch, J., et al., "Transparent Interconnection of Lots of Links (TRILL): Problem and Applicability Statement," May 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Anjing, et al., "Network Virtualization: Technologies, Perspectives, and Frontiers," Journal of Lightwave Technology, Feb. 15, 2013, 15 pages, IEEE.
Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-41, The Internet Society RFC(3746).
Yu, Minlan, et al., "Scalable Flow-Based Networking with DIFANE," Aug. 2010, pp. 1-16, In Proceedings of SIGCOMM.

\* cited by examiner

ASYMMETRIC CONNECTION WITH EXTERNAL NETWORKS

CLAIM OF BENEFIT TO PRIOR APPLICATIONS

This application claims the benefit of U.S. Provisional Patent Application 61/890,314, filed Oct. 13, 2013, which is incorporated herein by reference.

BACKGROUND

Many current enterprises have large and sophisticated networks including switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Even further, advances in network technology have allowed large datacenters to serve as hosts for tenant networks. Often, these tenant networks transmit substantially more data outside of the datacenter network than they receive. For instance, when the tenant network is a web server or a file distribution service the tenant network transmits substantially more data outside of the datacenter network than it receives. Managing these tenant networks has evolved into a complex field with substantial need for improvements in packet forwarding efficiency. There is a need in the art for optimizations in managing tenant networks that transmit substantial amounts of data outside of the managed network.

BRIEF SUMMARY

Some embodiments provide a managed network (e.g., within a data center) in which managed forwarding elements operating on host machines receive packets from an external network through designated gateway machines but send packets out onto the external network through a direct connection that bypasses the gateways. In some embodiments, the direct connection to the external network is enabled through the use of a specific logical port (called a direct host return ("DHR") port) of a logical forwarding element implemented by the managed forwarding elements.

In some embodiments, an administrator defines a logical network to be implemented within the physical network in a distributed fashion across the host machines. This logical network may include several logical forwarding elements (e.g., logical switches, logical routers, etc.), which may include ports connecting to one or more external networks. In some embodiments, these ports to external networks may include ports to gateways that handle packets both ingressing from and egressing to the external network. In addition, the ports may include DHR ports, which enable direct egress to the external network. To implement these ports, the gateway operates as a separate host with a connection to, e.g., a physical router of the external network. Managed forwarding elements, operating in the host machines along with virtual machines (VMs) connected to the logical network, send packets to, and receive packets from, the gateways. For packets sent to a DHR port, the managed forwarding elements of some embodiments send the packet to a separate set of forwarding tables (e.g., the routing tables of a network stack) on the host machine that include forwarding entries which send the packet through a direct connection to the external network (e.g., a physical router of the external network).

In order to implement a defined logical network in the physical managed network, in some embodiments, a network controller cluster (e.g., a hierarchical set of network controllers) configures the managed forwarding elements, including the gateway machines. Specifically, the network controller cluster configures a set of edge managed forwarding elements (i.e., the managed forwarding elements to which the VMs directly connect) to process packets received from other managed forwarding elements (e.g., for delivery to their local VMs) and from their local VMs (e.g., for delivery to other managed forwarding elements). This configuration, in some embodiments, involves flow entries used by the managed forwarding elements to process the packets. The flow entries are stored in the forwarding tables of the managed forwarding elements. These flow entries enable the DHR ports by instructing the managed forwarding elements to send packets destined for the external network (e.g., having an IP address unknown to the logical router, or in a set of IP addresses identified as corresponding to the external network) to the network stack on the physical host machine. The routing tables of this network stack are then separately configured (e.g., manually, by the controller cluster, etc.) to forward the packet to a physical router of the external network through a connection that does not pass through any of the other host machines of the managed network (e.g., avoiding the gateways).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
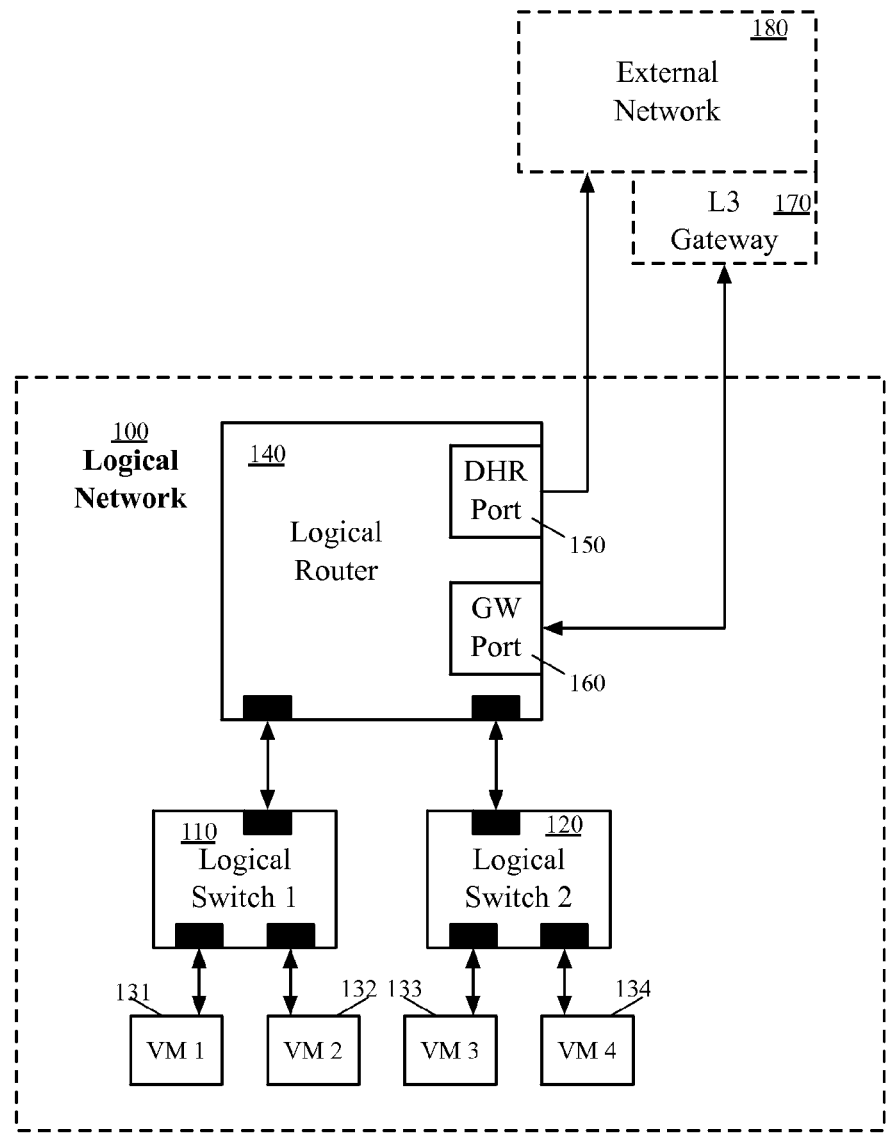
FIG. 1 conceptually illustrates a managed logical network with DHR ports according to some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a managed network (e.g., within a data center) in which managed forwarding elements operating on host machines receive packets from an external network through designated gateway machines but send packets out onto the external network through a direct connection that bypasses the gateways. In some embodiments, the direct connection to the external network is enabled through the use of a specific logical port (called a direct host return ("DHR") port) of a logical forwarding element implemented by the managed forwarding elements.

In some embodiments, an administrator defines a logical network to be implemented within the physical network in a distributed fashion across the host machines. This logical network may include several logical forwarding elements (e.g., logical switches, logical routers, etc.), which may include ports connecting to one or more external networks. In some embodiments, these ports to external networks may include ports to gateways that handle packets both ingressing from and egressing to the external network. In addition, the ports may include DHR ports, which enable direct egress to the external network. To implement these ports, the gateway operates as a separate host with a connection to, e.g., a physical router of the external network. Managed forwarding elements, operating in the host machines along with virtual machines (VMs) connected to the logical network, send packets to and receive packets from the gateways. For packets sent to a DHR port, the managed forwarding elements of some embodiments send the packet to a separate set of forwarding tables (e.g., the routing tables of a network stack) on the host machine that include forwarding entries which send the packet through a direct connection to the external network (e.g., a physical router of the external network).

In order to implement a defined logical network in the physical managed network, in some embodiments a network controller cluster (e.g., a hierarchical set of network controllers) configures the managed forwarding elements, including the gateway machines. Specifically, the network controller cluster configures a set of edge managed forwarding elements (i.e., the managed forwarding elements to which the VMs directly connect) to process packets received from other managed forwarding elements (e.g., for delivery to their local VMs) and from their local VMs (e.g., for delivery to other managed forwarding elements). This configuration, in some embodiments, involves flow entries used by the managed forwarding elements to process the packets. The flow entries are stored in the forwarding tables of the managed forwarding elements. These flow entries enable the DHR ports by instructing the managed forwarding elements to send packets destined for the external network (e.g., having an IP address unknown to the logical router, or in a set of IP addresses identified as corresponding to the external network) to the network stack on the physical host machine. The routing tables of this network stack are then separately configured (e.g., manually, by the controller cluster, etc.) to forward the packet to a physical router of the external network through a connection that does not pass through any of the other host machines of the managed network (e.g., avoiding the gateways).

FIG. 1 conceptually illustrates a logical network 100 of some embodiments. This figure illustrates logical forwarding elements in a logical network and logical links for communicating network traffic between the logical forwarding elements and an external network 180. Logical network 100 includes logical switches 110 and 120, logical router 140, and associated logical ports for use in transmitting network traffic between the listed logical forwarding elements. Logical networks are functionally separate networks that isolate traffic between tenants (e.g., customers that use the managed network to host their virtual machines) that use such logical networks. Logical networks may be implemented in parallel across several physical machines using virtual switches and other distributed forwarding elements. In some embodiments, logical networks are configured by network controllers (not shown). While logical network 100 is shown managing a network that includes virtual machines (VM 1 131 to VM 4 134 in the figure), the invention is not limited to the management of virtual machines and can be applied to hosted machines of different types, such as physical computers (e.g., x86 boxes).

Figure 2:
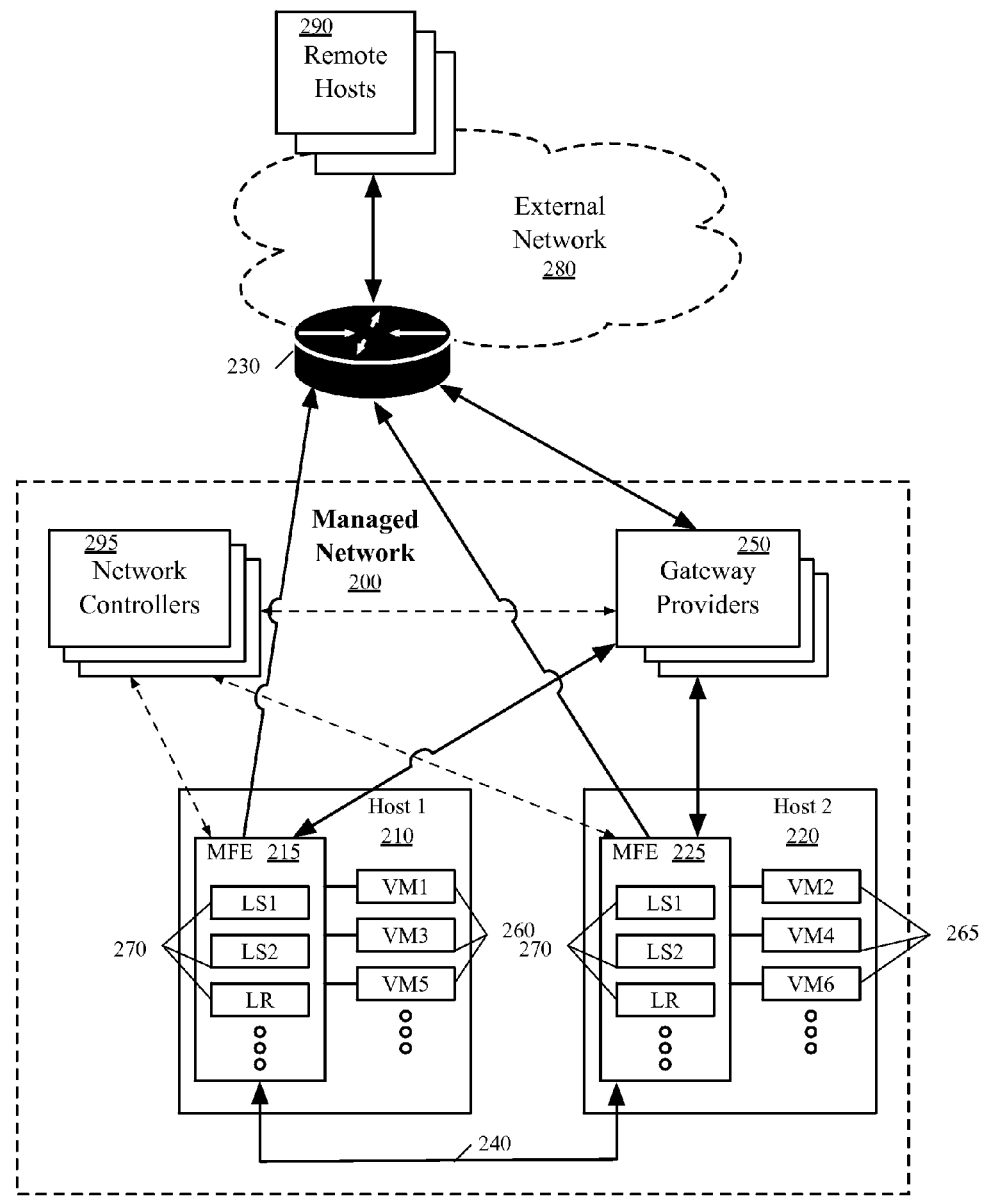
FIG. 2 conceptually illustrates a managed physical network according to some embodiments.

Logical network 100 as well as the logical forwarding elements of logical network 100 are abstractions rather than physical objects. The logical forwarding elements and the logical network are implemented by managed forwarding elements hosted on physical hosts (e.g. as shown in FIG. 2). The virtual machines 131-134 are hosted on the physical hosts of a managed network. The virtual machines 131-134 are also connected to the managed forwarding elements 215 and 225. In some embodiments, the virtual machines simulate the performance of an actual machine.

As shown in FIG. 1, logical switch 1 110 provides OSI layer 2 (hereinafter "L2") switching services for VM 1 131 and VM 2 132. Logical switch 2 120 provides L2 switching services for VM 3 133 and VM 4 134. Logical switches are implemented by managed forwarding elements on physical machines. Logical switch 1 110 and logical switch 2 120 include ports for links between virtual machines 131-134 and to logical router 140. The ports on logical switches 110 and 120 are conceptually illustrated in FIG. 1 as black boxes with arrowed lines to indicate links to other components in logical network 100. These ports are constructs that serve as communication endpoints within logical network 100. Typically, a network packet that is being processed through a logical forwarding element will have an ingress port that indicates from which port the network packet was received and an egress port to which the network packet is addressed. In some embodiments that will be discussed in greater detail below, logical processing is applied to such network packets to map them to different logical or physical ports. Processing of network packets at the first hop in logical networks is referred to as "edge networking". Edge networking enables physical networks to be designed without concern for the functionality of "core" physical appliances that are not adjacent to the hosted machines.

Logical router 140 provides OSI layer 3 (hereinafter "L3") routing services for packets originating from or directed to for logical switches 110 and 120. Similarly to logical switches 110 and 120, logical router 140 is implemented by managed forwarding elements on physical machines. Logical router 140 includes several ports it uses in communicating network packets within logical network 100. Logical router 140 includes two ports for receiving network traffic from and sending network traffic to logical switches 110 and 120.

In addition, logical router 140 includes a Direct Host Return port 150 (hereinafter "DHR port") and a gateway port 160 (abbreviated in the figure as "GW port"). Packets can be sent to or received from L3 gateway 170 through gateway port 160. As shown, L3 gateway 170 is not a part of logical network 100, rather it is maintained as a separate physical entity that implements aspects of logical network 100 for communication to the external network 180. L3 gateway 170 allows for communication between external network 180 and the logical network 100. For example, the external network 180 could include tenant enterprise networks that communicate with logical network 100 or other remote networks outside of the managed network. L3 gateway 170 also serves as the default exit and entry point for logical network 100. L3 gateway 170 performs initial processing of network packets entering logical network 100 and, by default, performs final packet processing of network packets exiting logical network 100. In some embodiments, L3 gateway 170 implements logical forwarding elements from logical network 100 (e.g., logical router 140).

As will be described in greater detail below, the first logical forwarding element that receives network packets originating from any of VMs 131-134 processes the packets by adding a logical context and logical forwarding information to the network packets. In some embodiments, as mentioned above, the logical network is an abstraction that is implemented by physical devices. In some embodiments, the logical forwarding elements are implemented by managed forwarding elements that are hosted on physical devices.

In the example shown in FIG. 1, logical router 140 is the only logical router of the logical network. However, in some embodiments, multiple levels of logical routers are provided in a logical network. In such embodiments, DHR ports can be opened on logical routers that are not the highest level logical router in a multiple level logical network. In some such embodiments, the highest level logical router is a centralized router which spans a gateway service (e.g., a data center provider router). The lower level logical routers are distributed routers that do not contain a gateway service (e.g., individual tenant routers). In some embodiments, to create a DHR port on the tenant routers, the default route from tenant routers to the provider router must be changed to the created DHR port. In other embodiments, to use a DHR port for a selected group of subnets, the selected subnets can be routed to the DHR port and at the same time a default route for the non-selected group of subnets can be maintained that points to the provider router. Subnets are logical subdivisions of tenant networks (e.g., IP subnets). In some embodiments, the tenant router services several subnets of a tenant network in order to route packets from one subnet to another.

L3 gateway 170 regulates network traffic between logical network 100 and external network 180. External network 180 includes addressable remote destinations (not shown in the figure) outside of the logical network 100. One of ordinary skill in the art would understand that the external network 180 can be many different types of computer networks, such as remote site networks, the Internet, etc. In some embodiments, L3 gateway 170 processes all traffic entering logical network 100.

Some embodiments of the invention provide the DHR port 150 as an alternative pathway out of logical network 100. Unlike network packets communicated using gateway port 160, packets sent from DHR port 150 are communicated directly to remote destinations through external network 180 without any further operations by intervening managed forwarding elements. Gateway port 160 receives traffic from and sends traffic to the external network outside of the logical network. In contrast to the gateway port 160, the DHR port 150 can only send traffic outside of the logical network, in some embodiments. In some embodiments, ingress traffic needs logical processing to gain logical context information. Accordingly, ingress traffic is taken in at the logical gateways, not through DHR ports on logical forwarding elements in some embodiments. In some embodiments, when a managed forwarding element that implements a logical router sends a packet out on a DHR port, the managed forwarding element strips all logical context from the network packet. Managed forwarding elements can safely remove logical context from egressing packets in that case because the logical forwarding element transmitting the context-removed network packets will be the last hop in the logical network.

As mentioned above, the logical networks of some embodiments are implemented by managed forwarding elements on managed networks of host machines. The following discussion will cover aspects of the invention at the physical level in a managed network.

FIG. 2 conceptually illustrates a managed network 200 of physical machines of some embodiments. Managed network 200 includes a first host 210, a second host 220, and gateway providers 250. These elements and links between them implement logical network 100 of FIG. 1 based on instructions received from network controllers 295. In some embodiments, these links are tunnels that allow traffic to be sent through other forwarding elements, such as unmanaged switches and routers. Managed network 200 provides networking services for hosted virtual machines and enables their communication with remote hosts 290 through physical network element 230 and external network 280.

The first host 210 and the second host 220 are computing devices running managed forwarding elements (e.g., virtual switching applications) of some embodiments. A managed forwarding element, in some embodiments, is a forwarding element managed by network controllers 295, and includes both the managed forwarding elements 215 and 225 as well as the gateway providers 250.

Network controllers 295 control how network packets will be forwarded to and from the managed virtual machines. In some embodiments the network controllers 295 provide this control by distributing flow entries to the managed forwarding elements 215 and 225 and gateway providers 250. The flow entries define actions to be performed on packets and the conditions under which those actions should be performed (i.e., packet characteristics that match the flow entry). Flow entries are stored in forwarding tables maintained by the managed forwarding elements 215 and 225 and gateway providers 250.

As shown in FIG. 2, both managed forwarding elements 215 and 225 are implementing logical forwarding elements 270. Logical forwarding elements 270 includes a first logical switch (abbreviated as "LS 1" in the figure), a second logical switch (abbreviated as "LS 2" in the drawing), and a logical router (abbreviated as "LR" in the drawing). LS 1, LS 2, and LR of logical forwarding elements 270 correspond to the logical switches 110 and 120 and logical router 140 of network 100 of FIG. 1.

In some embodiments, a set of virtual machines serviced by a particular logical switch can be distributed across multiple host machines. In order to process traffic to and from the virtual machines distributed across multiple host machines, managed forwarding elements 215 and 225 simultaneously implement separate instances of the same logical forwarding elements 270. For example, in the illustrated embodiment, VM 1 and VM 2 are both served by LS 1, yet VM 1 and VM 2 are hosted on different host machines. In order to send traffic between virtual machines located on disparate hosts, managed forwarding elements 215 and 225 are connect by link 240. In some embodiments, link 240 is a tunnel between host machines of a physical network. In at least some managed networks that operate logical networks over a physical network, packets are sent across the physical network in tunnels between managed forwarding elements. These tunneled packets are passed through the unmanaged physical forwarding elements (e.g., standard switches and routers) with minimal processing.

While only two managed forwarding elements are shown in managed network 200, in some embodiments any number of managed forwarding elements with any number of interconnecting links can be used. In some embodiments, logical forwarding elements 270 can include additional logical forwarding elements besides LS 1, LS 2, and LR (e.g., for other logical networks that connected VM 5 and VM 6).

As mentioned above, both managed forwarding elements 215 and 225 receive flow entries from network controllers 295 and populate forwarding tables used to implement logical forwarding elements 270. As described above the logical forwarding elements are abstractions that are implemented by the flow entries in the forwarding tables maintained by the managed forwarding elements.

The gateway providers 250 implement L3 gateways for logical networks (e.g., L3 gateway 170). When network traffic is addressed outside of the managed network 200, gateway providers 250 provide egress packet processing. When network traffic is received from outside the managed network 200, gateway providers 250 provide ingress packet processing. In some embodiments, gateway providers 250 are host machines (e.g., x86 boxes). Gateway providers 250 provide L3 gateways in an active-standby fashion, in some embodiments. For example, two host machines implement an L3 gateway with one being an active-master gateway and the other being a standby-backup gateway. In some embodiments, gateway providers 250 may be implemented by a single host machine.

Gateway providers 250 transmit network traffic to network entities outside of managed network 200. As shown in FIG. 2, gateway providers 250 communicate with physical network element 230. In some embodiments, gateway providers 250 communicate with remote hosts, remote routers, remote switches, or even local network elements that are outside of the local managed network. In the illustrated case, physical network element 230 is a network router for external network 280. Physical network element 230 communicates with remote hosts 290 through external network 280. Remote hosts 290 and physical network element 230 are outside of managed network 200, and are therefore outside of any logical context present in managed network 200. Accordingly, when physical network element 230 transmits network packets to managed network 200, gateway providers 250 handle ingress processing of these packets to add logical context (e.g., forwarding information that identifies the packet's status within the logical network such as a logical egress port of a logical forwarding element) to these packets.

However, gateway providers 250 are not the only forwarding element that sends egress packets to physical network element 230. In some embodiments, managed forwarding elements communicate egress traffic to the physical network using DHR ports. In some embodiments, managed forwarding elements 215 and 225 can implement DHR ports on any number of the logical forwarding elements 270. By transmitting egress packets over the DHR ports, managed forwarding elements 215 and 225 reduce the processing load on gateway providers 250. As mentioned above, managed forwarding elements 215 and 225 can safely remove logical context from egressing packets (e.g., when transmitting them to DHR ports) because the managed forwarding element transmitting the context-removed network packets will be the last hop in the logical network implemented by the managed forwarding elements. In some embodiments, DHR ports are used when there is substantially more egress traffic than ingress traffic, such as when the hosted virtual machines are web servers transmitting substantially more data to end users than the virtual machines are receiving from the end users. In some embodiments, the routes to the physical network element 230 from managed forwarding elements 215 and 225 through the DHR ports are configured as static routes. In some such embodiments, the DHR ports cannot be created to use dynamic routing. However, even in such embodiments, the portions of any routes beyond the first external physical network entity connected to a route through a DHR port can be either static or dynamic routes.

In the above description of FIGS. 1 and 2, reference to "physical" components (e.g., physical switching element, physical ports, etc.) refers to the managed forwarding elements in the managed network. As explained above, a managed forwarding element may be a hardware switching element, a software switching element, or a virtual switching element. Thus, one of ordinary skill in the art will realize that the reference to a physical component is not meant to refer to an actual physical component, but rather the reference is meant to distinguish from logical components (e.g., a logical forwarding element, a logical port, etc.). In addition, the example networks provided include network elements in example quantities (e.g. two managed forwarding elements and four VMs) that are merely provided for demonstration. One of ordinary skill in the art will realize that the invention is not limited to the example quantities of network elements shown in the figures.

Many examples of forwarding network traffic in managed networks using direct host return ports are described below. Section I describes packet transmission in managed networks with DHR ports. Section II describes a managed forwarding element for implementing DHR ports in logical networks. Section III describes how a network controller of some embodiments configures managed forwarding elements to use DHR ports. Finally, Section IV describes an electronic system with which some embodiments of the invention are implemented.

I. Packet Transmission Using DHR Ports

Figure 3:
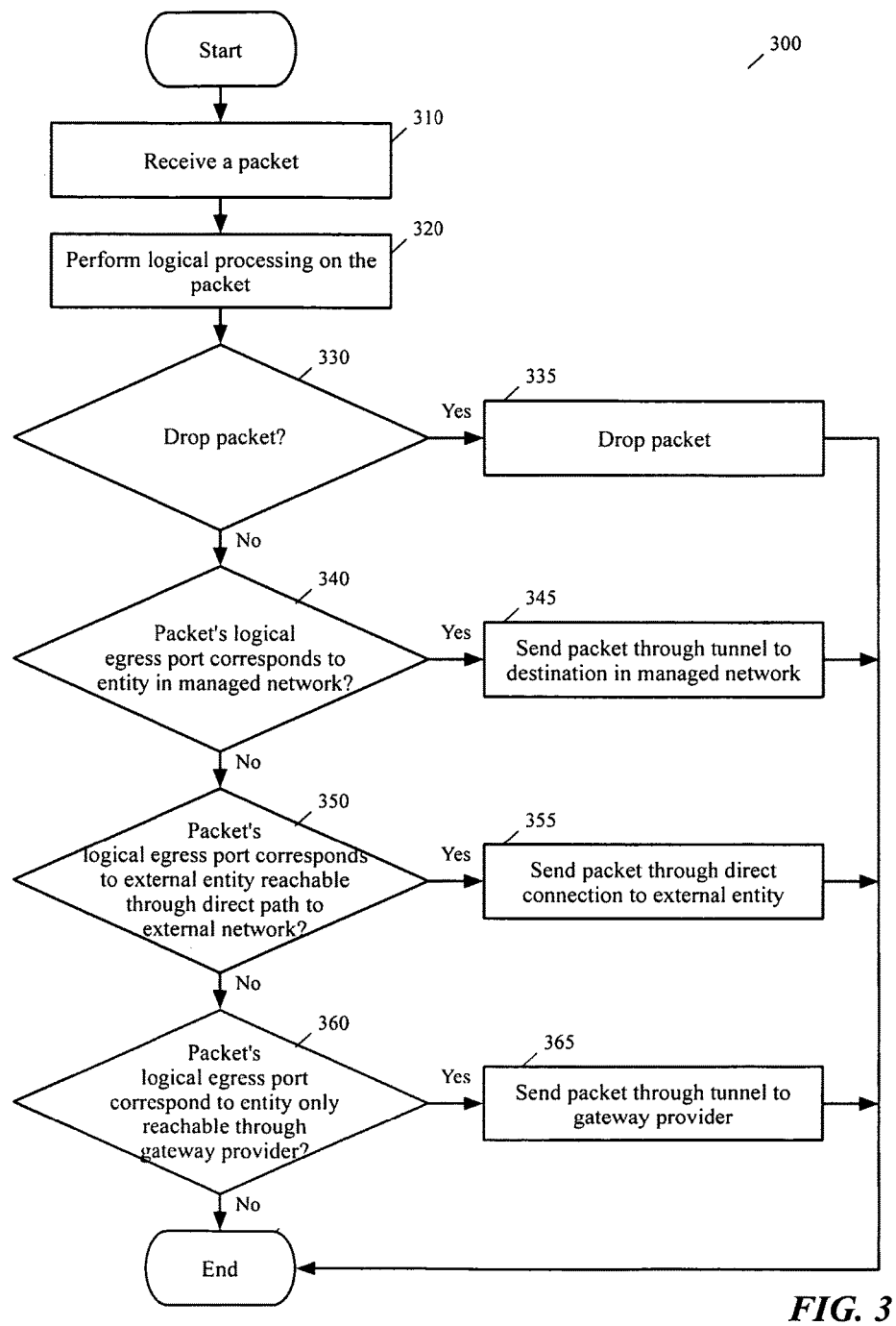
FIG. 3 conceptually illustrates a packet transmission process of some embodiments.

FIG. 3 conceptually illustrates a process 300 performed by a managed forwarding element of some embodiments. In some embodiments, the managed forwarding element performing process 300 is a managed forwarding element in a managed network such as those described in FIG. 2. The managed forwarding element of some embodiments performs this process using flow tables that implement logical forwarding elements. The logical forwarding elements of the described logical networks are abstractions implemented by managed forwarding elements. In some embodiments, some or all of the transmissions through the logical networks involve no physical transmission of packets as packets traverse the logical network within processing performed by a single managed forwarding element.

As shown in FIG. 3, the process 300 begins by receiving (at 310) a packet. In some embodiments, the packet is a network packet with a header and a payload. The packet header indicates source and destination addresses, as well as logical context in some embodiments of the invention. As mentioned above, logical context can include processing information that identifies the packet's status within the logical network such as a logical egress port. The packet payload contains the information to be delivered by the packet. The term "packet" is used herein to describe any collection of bits organized in a particular format for transmission.

Next, the process 300 performs (at 320) logical processing on the packet. In some embodiments, logical processing (at 320) will entail passing a packet through a logical processing pipeline. The logical processing pipeline of some embodiments sequentially performs a series of mapping operations to implement the actions of the logical forwarding elements. Such actions include forwarding a packet, modifying a packet, dropping a packet, etc. Examples of logical processing pipelines will be discussed in detail below in connection with FIGS. 4-6.

As a result of performing logical processing (at 320) on the received packet, the managed forwarding element will assign a logical egress port of a logical forwarding element to the packet. A logical egress port is a logical construct that corresponds to a physical interface (e.g., an interface to a virtual machine, a particular connection to an external network, etc.). The logical egress port will affect how the packet is handled at determinations 330, 340, 350, and 360.

After performing logical processing on the packet, the process 300 then determines (at 330) whether to drop the packet. In some embodiments, the decision to drop a packet is made during the logical processing operations performed at step 320. For example, access control list (abbreviated "ACL") operations performed as part of the logical processing may specify to drop a packet. When a packet is to be dropped, the process 300 proceeds to drop (at 335) the packet and then the process ends.

When the process 300 does not drop the packet, the process 300 determines (at 340) whether the packet's logical egress port corresponds to an entity in the managed network (e.g., a virtual machine hosted in the managed network). When the packet's logical egress port corresponds to an entity in the managed network, the process 300 sends (at 345) the packet through a tunnel to a destination in managed network (e.g., a managed forwarding element at the host machine on which the destination virtual machine resides).

When the packet's logical egress port does not correspond (at 340) to an entity in the managed network, then the process 330 determines (at 350) whether the packet's logical egress port corresponds to an external entity reachable through a direct path to an external network. In some embodiments, this direct path is through a DHR port of a logical forwarding element implemented by the managed forwarding element performing process 300. When the packet's logical egress port corresponds to such an external entity, the process 300 sends (at 355) the packet through the direct connection to the external entity. By transmitting the packet through the direct connection, the managed forwarding element bypasses any additional managed forwarding elements, such as gateway providers 250 shown in FIG. 2. Bypassing any additional managed forwarding elements is possible because packets to an external entity don't need any further logical processing in the logical network. These direct connections are especially useful when a hosted VM sends large quantities of traffic to external entities. This is a common scenario for web servers.

When the packet's logical egress port does not correspond to an external entity reachable through a direct connection, the process 300 determines (at 360) whether the packet's logical egress port corresponds to an entity only reachable through a gateway provider. As mentioned above, a gateway provider allows for integration of a managed network with external networks. In some embodiments, the gateway provider will be the last managed forwarding element to handle a packet before the packet leaves the managed network. When the packet's logical egress port corresponds to an entity only reachable through a gateway provider (i.e., the logical egress port is the port of an L3 router that connects to an L3 gateway), the process 300 sends (at 365) the packet through a tunnel to a gateway provider. Once the packet is at the gateway provider, the gateway provider will perform the final transmission of the packet outside of the managed network (not shown).

Figure 4:
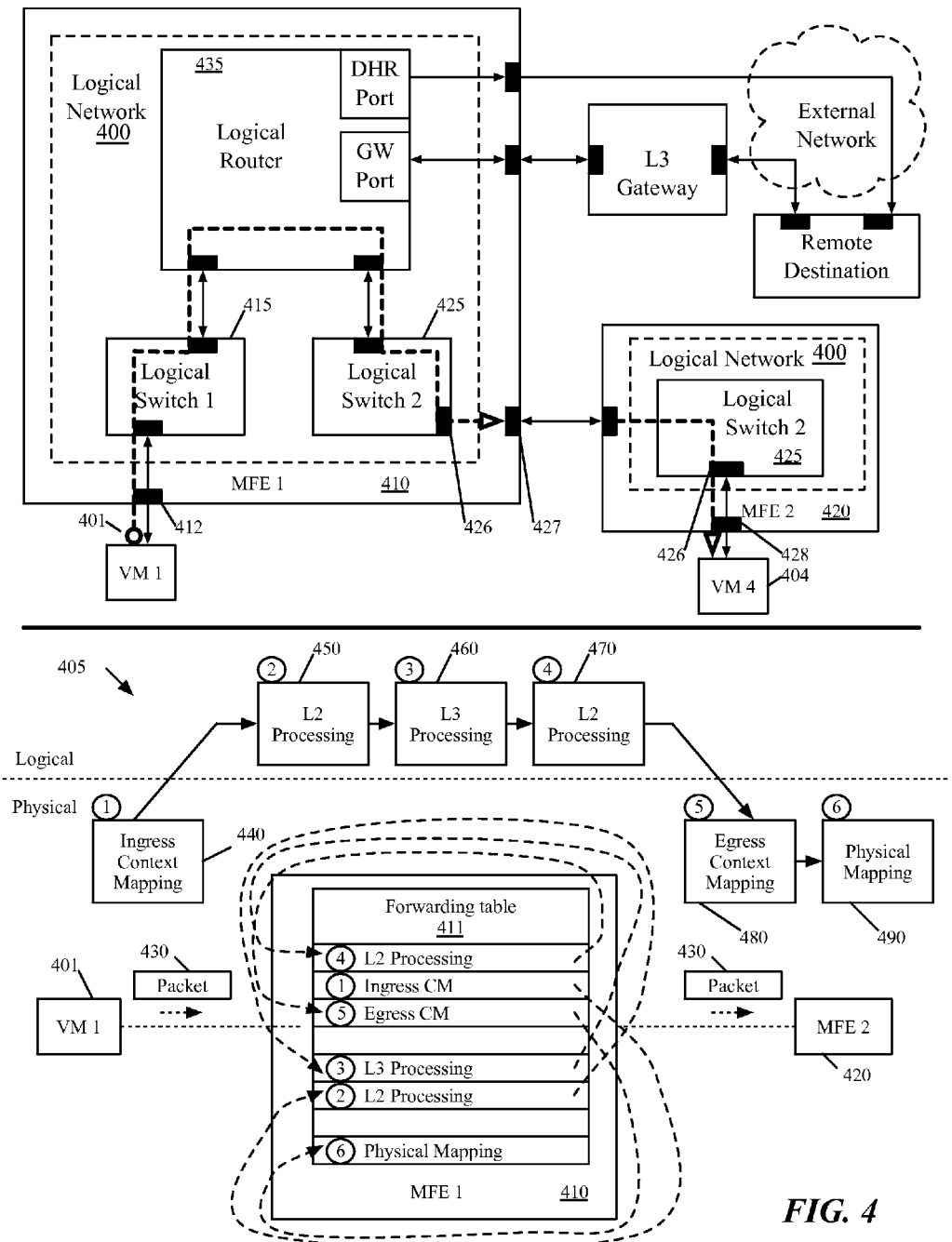
FIG. 4 conceptually illustrates an example packet transmission from one entity on a managed network to another entity on the managed network.

The above process indicates three different scenarios based on different logical processing results for a packet. These three scenarios are illustrated below in FIGS. 4-6. FIG. 4 conceptually illustrates an example transmission of a packet from a first virtual machine hosted on a first host to a second virtual machine hosted on a second host. The packet is transmitted through a logical network that is implemented by managed forwarding elements hosted on both the first host and the second host. The managed forwarding elements implement the logical network using flow entries that define actions to be taken on packets and conditions under which to take those actions. Each flow entry corresponds to an operation in a logical processing pipeline for transmitting the packet through the logical network. The logical processing pipeline directs the first managed forwarding element to transmit the packet to the second managed forwarding element. Once the packet reaches the second managed forwarding element on the second host, the second managed forwarding element forwards the packet to second virtual machine.

As shown in the top half of FIG. 4, this example demonstrates a transmission of a packet 430 from VM 1 401 on managed forwarding element 1 410 to VM 4 404 on managed forwarding element 2 420 through a logical network 400. This transmission is conceptually illustrated by the dashed arrow beginning at the hollow circle over VM 1 401. To traverse the logical network, the packet 430 will have to pass through logical switch 1 415, logical router 435, and logical switch 2 425. Similar to the logical network 100 shown in FIG. 1 and the managed network 200 shown in FIG. 2, VM 1 401 is connected to managed forwarding element 1 410 on a first host machine, whereas VM 4 404 is connected to managed forwarding element 2 420 on a second host machine. This figure (and the subsequent FIGS. 5 and 6) illustrates the logical network conceptually shown within the managed forwarding elements, as traversed by the packet. Thus, because logical switch 2 425 processing takes place in both managed forwarding element 1 and managed forwarding element 2, it is shown on both. One of ordinary skill would recognize that, e.g., managed forwarding element 2 420 also implements the logical switch 1 415 and the logical router 435, but that these flow entries are not involved in the processing of the illustrated packet.

Logical network 400 is implemented by both managed forwarding element 1 410 and managed forwarding element 2 420. As mentioned above, logical networks and logical forwarding elements are abstractions implemented by managed forwarding elements hosted on host machines. Accordingly, for packet 430 from VM 1 401 on the first host to reach VM 4 404 on the second host, managed forwarding element 410 on the first host will have to transmit the packet 430 to managed forwarding element 420 on the second host.

The bottom half of FIG. 4 conceptually illustrates a logical processing pipeline 405 implemented by managed forwarding element 1 410 that will receive the packet 430 from VM 1 401, perform logical processing on packet 430, and then forward the packet to managed forwarding element 2 420. Processing pipeline 405 illustrates the logical processing operations performed by managed forwarding element 410 before physically transmitting packet 430 to managed forwarding element 420 for subsequent transmission to VM 4 404. This processing pipeline is implemented by the managed forwarding element 410 using flow entries in the forwarding table 411 of managed forwarding element 410. As described above, a flow entry contains actions to be taken on a packet (e.g., modifying, forwarding, or dropping a packet etc.) and conditions under which to take those actions (e.g., characteristics of incoming packets).

In some embodiments, each operation performed on a packet in the logical network is represented by one or more flow entries in the forwarding table 411. The managed forwarding element 410 checks the characteristics of the packet against the conditions of each flow entry in the forwarding table 411 and performs the actions dictated by a flow entry whose conditions match the characteristic of the packet. For simplicity, the process by a managed forwarding element of checking the packet against the flow entries and performing the indicated actions is referred to herein as "submitting" the packets to the forwarding table.

In some cases, the action of a flow entry may change the packet's characteristics and direct the managed forwarding element 410 to resubmit the changed packet to the forwarding table 411 (e.g., when the actions include "sending" the packet to a dispatch port). A dispatch port is a software construct that corresponds to a port in the logical network between elements implemented on the same host machine. The dispatch port does not correspond to a physical port. When the managed forwarding element determines that a flow entry (the conditions of which match a packet's characteristics) indicates that the packet is to be routed to a dispatch port, the managed forwarding element changes the packet's characteristics (e.g., the packet's header, or information stored about the packet in registers) as indicated by the flow entry and then compares the new characteristics of the packet against the flow entries to determine what new action is warranted. The managed forwarding elements of some embodiments repeatedly change the packet and compare the packet's characteristics to the flow entries until the packet's characteristics match a flow entry that dictates that the packet be either dropped or forwarded to one or more physical egress ports. In some embodiments, the managed forwarding element 410 (of FIG. 4) may submit the packet to the forwarding table 411 multiple times to implement a multi-operation logical processing pipeline.

In the illustrated example, the packet 430 is repeatedly resubmitted to forwarding table 411 to implement logical processing pipeline 405. As mentioned above, in some embodiments, the managed forwarding element 410 uses software elements called "dispatch ports" to resubmit a packet to the forwarding table 411. The managed forwarding element 410 repeatedly submits the packet 430 to logical forwarding table 411 until the managed forwarding element 410 determines that a flow entry dictates that the packet should be either dropped or forwarded to one or more physical egress ports (e.g., sent to another host machine or out of the network). This resubmission process is conceptually illustrated by the dashed re-circling arrows leading from the right side of forwarding table 411 to the left side of forwarding table 411. Forwarding table 411 is a single table of flow entries. However, in some embodiments, managed forwarding elements use multiple forwarding tables instead of a single forwarding table.

Initially, managed forwarding element 410 receives packet 430 from VM 1 401 at a physical ingress port 412 of the managed forwarding element 410. As described herein, the term "physical ingress port" is a virtual interface between a virtual machine implemented on a host and a managed forwarding element on the same host. From the perspective of the virtual machine, the virtual interface functions as a physical network port. In some embodiments, the managed forwarding element 410 stores an indicator of the physical ingress port 412 of the packet in a temporary storage on the managed forwarding element 410 (e.g., a register). The managed forwarding element 410 then begins processing the packet 430 by attempting to match the packet's characteristics to conditions of flow entries in forwarding table 411.

At the first stage 440 of processing pipeline 405, the managed forwarding element 410 identifies a flow entry indicated by an encircled 1 (referred to as "flow entry 1") in the forwarding table that implements ingress context mapping. This identification is based on fields stored in a header of packet 430 and data for the packet (e.g., physical ingress port 412) that has been stored in registers on the managed forwarding element 410. Flow entry 1 then maps the stored physical ingress port 412 to a logical ingress port on logical switch 415. Flow entry 1 also assigns the packet 430 a logical context. At this stage, the assigned logical context will be the logical ingress port of the particular logical switch. In some embodiments, the assigned logical context will include information indicating the packet's status within a logical network. The flow entry 1 also specifies that the packet 430 should be sent to a dispatch port (i.e., resubmitted to the forwarding table 411 by managed forwarding element 410) as illustrated by the curved dashed arrows leading from flow entry 1 to flow entry 2.

At the second stage 450 of processing pipeline 405, the managed forwarding element 410 identifies a flow entry indicated by an encircled 2 (referred to as "flow entry 2") in the forwarding table. Based on flow entry 2, the managed forwarding element 410 implements the L2 processing that corresponds to the forwarding actions of logical switch 1 415 in logical network 400. In some embodiments, the L2 processing includes several flow entries followed by resubmits and includes performing ingress ACL functions before the switching decision and egress ACL functions after the switching decision. If a packet fails to pass the ingress ACL or the egress ACL, then the packet will be dropped. In this case, the L2 processing of stage 450 results in the packet 430 being "forwarded" from logical switch 1 415 to logical router 435 based on the destination MAC address of the packet corresponding to the egress port of the logical switch 415 that attaches to the logical router. In some embodiments, the managed forwarding element stores this forwarding decision in the packet registers. The flow entry 2 also specifies that the packet should be resubmitted to the forwarding table 411 (e.g., by sending the packet 430 to a dispatch port, as conceptually illustrated by the curved dashed arrows leading from flow entry 2 to flow entry 3).

At the third stage 460 of processing pipeline 405, the managed forwarding element 410 identifies a flow entry indicated by an encircled 3 (referred to as "flow entry 3") in the forwarding table that implements the logical L3 processing of the packet. As with the L2 processing, this may actually involve several flow entries (e.g., ingress ACL, logical L3 routing, and egress ACL). The managed forwarding element 410 uses flow entry 3 to implement the L3 processing of the stage 460 that corresponds to the forwarding actions of logical router 435 in logical network 400. In this case, the L3 processing of stage 460 will result in the packet 430 being forwarded from the logical router 435 to logical switch 2 425 based on the destination IP address of the packet. In addition, the logical router 435 will modify to change the destination MAC address to the address corresponding to this destination IP address (performing address resolution if necessary). In some embodiments, the managed forwarding element stores this forwarding decision in the packet registers. The flow entry 3 also specifies that the packet 430 should be resubmitted to the forwarding table 411 (e.g., by sending the packet 430 to a dispatch port, as conceptually illustrated by the curved dashed arrows leading from flow entry 3 to flow entry 4).

At the fourth stage 470 of processing pipeline 405, the managed forwarding element 410 identifies a flow entry indicated by an encircled 4 (referred to as "flow entry 4") in the forwarding table that implements the L2 processing of stage 470. The managed forwarding element 410 uses flow entry 4 to implement L2 processing that corresponds to the forwarding actions of logical switch 2 425 in logical network 400. Again this may entail several flow entries for different operations of the L2 processing. In this case, the L2 processing of stage 470 results in the packet being logically forwarding to a logical egress port 426 of logical switch 425 that corresponds to VM 4 404, based on the destination MAC address of the packet as modified by the L3 operations 460. However, the flow entry 4 still indicates that the packet should be sent to a dispatch port because the managed forwarding element 410 will use further flow entries in forwarding table 411 to determine how to send the packet 430 to the physical destination corresponding to this logical egress port 426.

In the fifth stage 480 of processing pipeline 405, the managed forwarding element 410 identifies, based on the logical egress port 426, a flow entry indicated by an encircled 5 (referred to as "flow entry 5") in the forwarding table 411. The managed forwarding element 410 uses the flow entry to implement egress context mapping. In this example, the egress context mapping maps the logical egress port 426 to a physical destination (i.e., the managed forwarding element 420) for the packet 430. The flow entry 5 additionally specifies for the packet 430 to be further processed by the forwarding table (e.g., by sending the packet 430 to a dispatch port, as conceptually illustrated by the curved dashed arrows leading from flow entry 5 to flow entry 6).

At the sixth stage 490 of processing pipeline 405, the managed forwarding element 410 identifies a flow entry indicated by an encircled 6 (referred to as "flow entry 6") in the forwarding table. The managed forwarding element 410 uses flow entry 6 to implement the physical mapping of the stage 490. The managed forwarding element 410 uses flow entry 6 to map the physical destination (e.g., managed forwarding element 420) identified in the previous stage to a physical port 427 used by managed forwarding element 410 to reach managed forwarding element 420. This may involve adding tunnel encapsulation to the packet in some embodiments. In this case, no more resubmissions are necessary and the managed forwarding element 410 sends the packet 430 out of the identified physical port 427 of managed forwarding element 410 that reaches managed forwarding element 420.

When the managed forwarding element 420 receives the packet 430 from the managed forwarding element 410, the managed forwarding element 420 begins processing the packet 430 based on a forwarding table of the managed forwarding element 420 (not shown). Based on the logical egress port 426 for the packet identified in stage 470 (i.e. a port on logical switch 2 425) the managed forwarding element 420 identifies a physical port 428 of the managed forwarding element 420 to which the VM 4 404 is coupled as the port to which the packet 430 is to be forwarded. As illustrated, logical egress port 426 on logical switch 2 425, is present in logical network 400 on both managed forwarding element 1 410 and managed forwarding element 2 420. Though logical egress port 426 is illustrated twice, it is in fact the same logical port implemented by both of the managed forwarding elements. The managed forwarding element 420 then forwards the packet 430 to VM 4 404 over the identified physical port 428 used by managed forwarding element 420 (e.g., a virtual interface of the VM 4 404.

Figure 5:
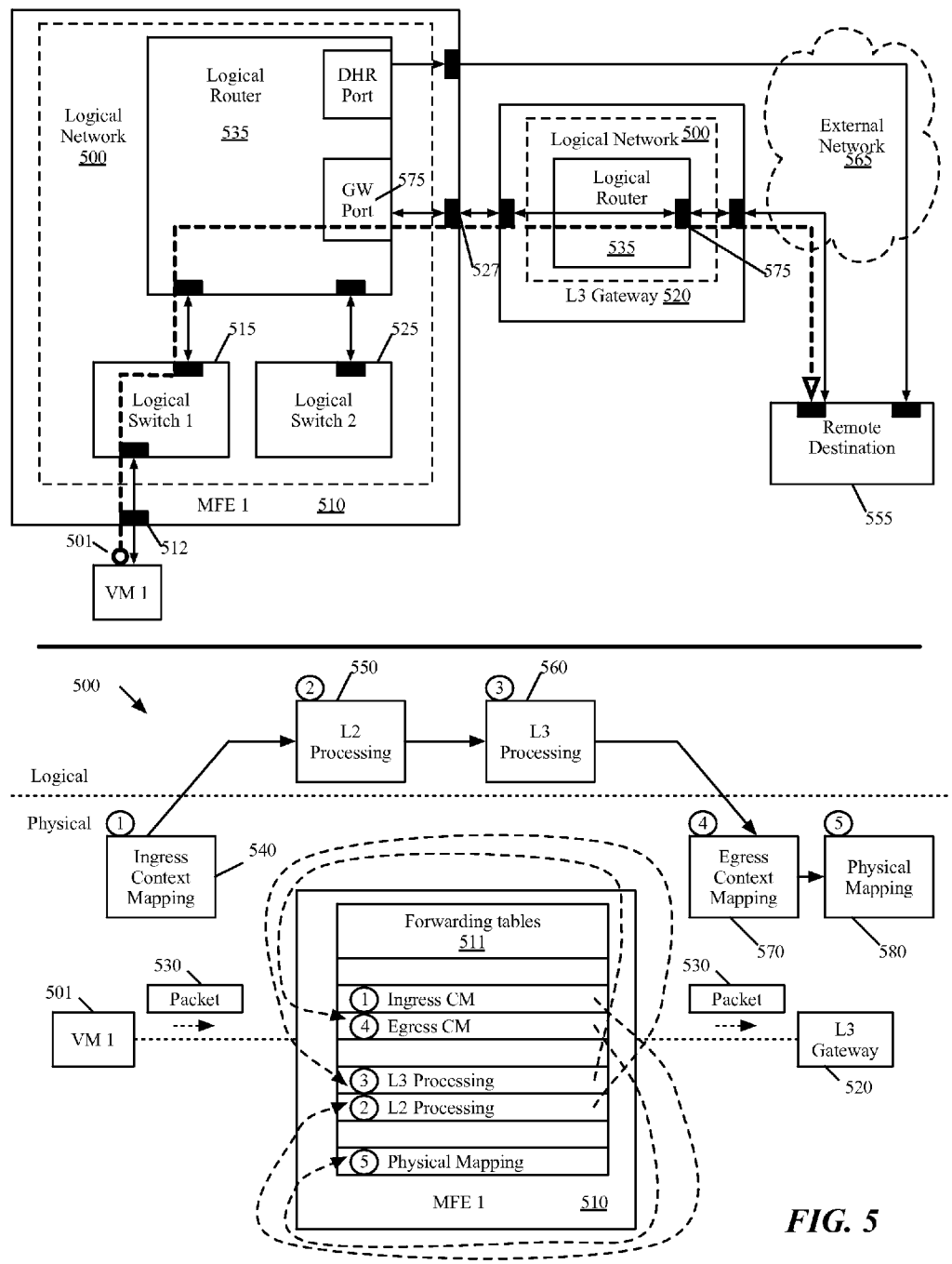
FIG. 5 conceptually illustrates an example packet transmission from one entity on a managed network to a remote destination using a gateway.

FIG. 5 conceptually illustrates an example transmission of a packet from a virtual machine hosted on a host to a remote destination using an L3 gateway. The packet is transmitted through a logical network that is implemented by managed forwarding elements hosted on several physical hosts, as well as at least in part by the L3 gateway. The managed forwarding elements implement the logical network using flow entries that define actions to be taken on packets and conditions under which to take those actions. Each flow entry corresponds to an operation in a logical processing pipeline for transmitting the packet through the logical network. The logical processing pipeline directs the managed forwarding element to transmit the packet to a gateway for transmission outside of the logical network. Once the packet reaches the gateway, the gateway forwards the packet to the remote destination outside of the logical network.

As shown in the top half of FIG. 5 this example demonstrates an example conceptual transmission of a packet 530 from VM 1 501 to remote destination 555. This transmission is conceptually illustrated by the dashed arrow beginning at the hollow circle over VM 1 501. To traverse the logical network, the packet 530 will have to pass through logical switch 1 515, logical router 535, and L3 gateway 520. Similar to the logical network 100 shown in FIG. 1 and the managed network 200 shown in FIG. 2, VM 1 501 is connected to managed forwarding element 1 510 on a host machine. Gateway 520 is, e.g., one of the gateway providers 250 in FIG. 2 (e.g., a master L3 gateway for the logical network 500). As mentioned above, logical networks and logical forwarding elements are abstractions being implemented by managed forwarding elements hosted on host machines. Accordingly, for packet 530 from VM 1 501 on the host to reach remote destination 555, managed forwarding element 510 on the host will have to transmit the packet 530 to L3 gateway 520. This figure illustrates the logical network conceptually shown within the managed forwarding elements (including within gateway 520), as traversed by the packet. Thus, because logical router 535 processing takes place in both managed forwarding element 1 510 and L3 gateway 520, it is shown on both.

The bottom half of FIG. 5 conceptually illustrates a logical processing pipeline 505 implemented by managed forwarding element 1 510 that will receive the packet 530 from VM 1 501, perform logical processing on packet 530, and then forward the packet to gateway 520. Processing pipeline 505 illustrates the logical processing operations performed by managed forwarding element 510 before physically transmitting packet 530 to gateway 520 for subsequent transmission to remote destination 555. This processing pipeline is implemented by the managed forwarding element 510 using flow entries in the forwarding table 511 of managed forwarding element 510. As described above, a flow entry contains actions to be taken on a packet (e.g., modifying, forwarding, or dropping a packet etc.) and conditions under which to take those actions (e.g., characteristics of incoming packets).

In some embodiments, each operation performed on a packet in the logical network is represented by one or more flow entries in the forwarding table 511. The managed forwarding element 510 checks the characteristics of the packet against the conditions of each flow entry in the forwarding table 511 and performs the actions dictated by the flow entry whose conditions match the characteristic of the packet. For simplicity, the process by a managed forwarding element of checking the packet against the flow entries and performing the indicated actions is referred to herein as "submitting" the packets to the forwarding table.

In some cases, the action of the flow entry may change the packet's characteristics and direct the managed forwarding element 510 to resubmit the changed packet to the forwarding table 511 (e.g., when the actions include "sending" the packet to a dispatch port). In some embodiments, the managed forwarding element 510 (of FIG. 5) may submit the packet to the forwarding table 511 multiple times to implement a multi-operation logical processing pipeline.

In the illustrated example, the packet 530 is repeatedly resubmitted to forwarding table 511 to implement logical processing pipeline 505. As mentioned above, in some embodiments, the managed forwarding element 510 uses software elements called "dispatch ports" to resubmit a packet to the forwarding table 511. The managed forwarding element 510 repeatedly submits the packet 530 to logical forwarding table 511 until the managed forwarding element 510 determines that a flow entry dictates that the packet should be either dropped or forwarded to one or more physical egress ports (e.g., sent to another host machine or out of the network). This re-submission process is conceptually illustrated by the dashed re-circling arrows leading from the right side of forwarding table 511 to the left side of forwarding table 511. Forwarding table 511 is a single table of flow entries. However, in some embodiments, managed forwarding elements use multiple forwarding tables instead of a single forwarding table.

Initially, managed forwarding element 510 receives packet 530 from VM 1 501 at a physical ingress port 512 of the managed forwarding element 510. In some embodiments, the managed forwarding element 510 stores an indicator of the physical ingress port 512 of the packet in a temporary storage on the managed forwarding element 510 (e.g., a register). The managed forwarding element 510 then begins processing the packet 530 by attempting to match the packet's characteristics to conditions of flow entries in forwarding table 511.

At the first stage 540 of processing pipeline 505, the managed forwarding element 510 identifies a flow entry indicated by an encircled 1 (referred to as "flow entry 1") in the forwarding table that implements ingress context mapping. This identification is based on fields stored in a header of packet 530 and data for the packet (e.g., physical ingress port) that has been stored in registers on the managed forwarding element 510. Flow entry 1 then maps the stored physical ingress port to a logical ingress port on logical switch 515. Flow entry 1 also assigns the packet 530 a logical context. At this stage, the assigned logical context will be the logical ingress port of the particular logical switch. In some embodiments, the assigned logical context will include information indicating the packet's status within a logical network. The flow entry 1 also specifies that the packet 530 should be sent to a dispatch port (i.e., resubmitted to the forwarding table 511 by managed forwarding element 510) as illustrated by the curved dashed arrows leading from flow entry 1 to flow entry 2.

At the second stage 550 of processing pipeline 505, the managed forwarding element 510 identifies a flow entry indicated by an encircled 2 (referred to as "flow entry 2") in the forwarding table. Based on flow entry 2, the managed forwarding element 510 implements the L2 processing that corresponds to the forwarding actions of logical switch 1 515 in logical network 500. This identification is based on the logical context and/or other fields stored in the header of packet 530. In some embodiments, the L2 processing includes several flow entries followed by resubmits and includes performing ingress ACL functions before the switching decision and egress ACL functions after the switching decision. If a packet fails to pass the ingress ACL or the egress ACL, then the packet will be dropped. In this case, the L2 processing of stage 550 results in the packet 530 being "forwarded" from logical switch 1 515 to logical router 535 based on the destination MAC address of the packet corresponding to the egress port of the logical switch 515 that attaches to the logical router. In some embodiments, the managed forwarding element stores this forwarding decision in the packet registers. The flow entry 2 also specifies that the packet should be re-submitted to the forwarding table 511 (e.g., by sending the packet 530 to a dispatch port, as conceptually illustrated by the curved dashed arrows leading from flow entry 2 to flow entry 3).

At the third stage 560 of processing pipeline 505, the managed forwarding element 510 identifies a flow entry indicated by an encircled 3 (referred to as "flow entry 3") in the forwarding table that implements the logical L3 processing of the packet. The managed forwarding element 510 uses flow entry 3 to implement the L3 processing of the stage 560 that corresponds to the forwarding actions of logical router 535 in logical network 500. As in the previous cases, this stage may involve several flow entries, e.g. to perform L3 ingress ACL, logical L3 forwarding, and L3 egress ACL. In this case, the L3 processing of stage 560 results in the packet 530 being logically forwarded to the logical port of the logical router 535 that connects to the L3 gateway 520. That is, the L3 processing identifies the gateway port 575 as the logical egress port of the logical router 535. In some embodiments, this decision is based on (i) the destination IP address of the packet not matching any of the subnets served by the other logical router ports and (ii) the source IP address of the packet matching a subnet that sends packets to external networks through a gateway. In addition, flow entry 3 specifies to resubmit the packet to the dispatch port of the managed forwarding element 510 for additional processing in order to effectuate this logical forwarding decision.

In the fourth stage 570 of processing pipeline 505, the managed forwarding element 510 identifies, based on the logical egress port identified in the previous stage (e.g., gateway port 575), a flow entry indicated by an encircled 4 (referred to as "flow entry 4") in the forwarding table 511. The managed forwarding element 510 uses the flow entry to implement egress context mapping. Whereas in the previous example of VM to VM traffic, the L3 processing resulted in subsequent L2 processing, in this case the L3 forwarding decision sends the packet out of the managed network via a gateway, and therefore the packet will never be processed by the flow entries for a second logical switch. Instead, because the L3 forwarding decision results in a logical egress port that maps to a gateway, the next flow entry identified (flow entry 4) is an egress context mapping operation that maps the logical egress port to a physical destination. Specifically, this physical destination is a physical L3 gateway used to implement a gateway connection to the external network (e.g., by stripping the logical context off of the packet and sending the packet to a physical router of the external network).

At the fifth stage 580 of processing pipeline 505, the managed forwarding element 510 identifies a flow entry indicated by an encircled 5 (referred to as "flow entry 5") in the forwarding table. The managed forwarding element 510 uses flow entry 5 to implement the physical mapping of the stage 580. This may involve adding tunnel encapsulation to the packet in some embodiments. In this case, no more resubmissions are necessary and the managed forwarding element 510 sends the packet 530 out of the identified port 527 of managed forwarding element 510 that reaches gateway 520.

When the gateway 520 receives the packet 530 from the managed forwarding element 510, the gateway 520 begins processing the packet 530 based on a forwarding table of the gateway 520. Based on the logical egress port 575 for the packet identified in stage 570, the gateway 520 identifies a physical port that connects to the next hop for reaching remote destination 555 (e.g., a physical router of the external network). The gateway 520 then removes logical context stored with the packet and forwards the packet 530 to the identified next hop destination.

Figure 6:
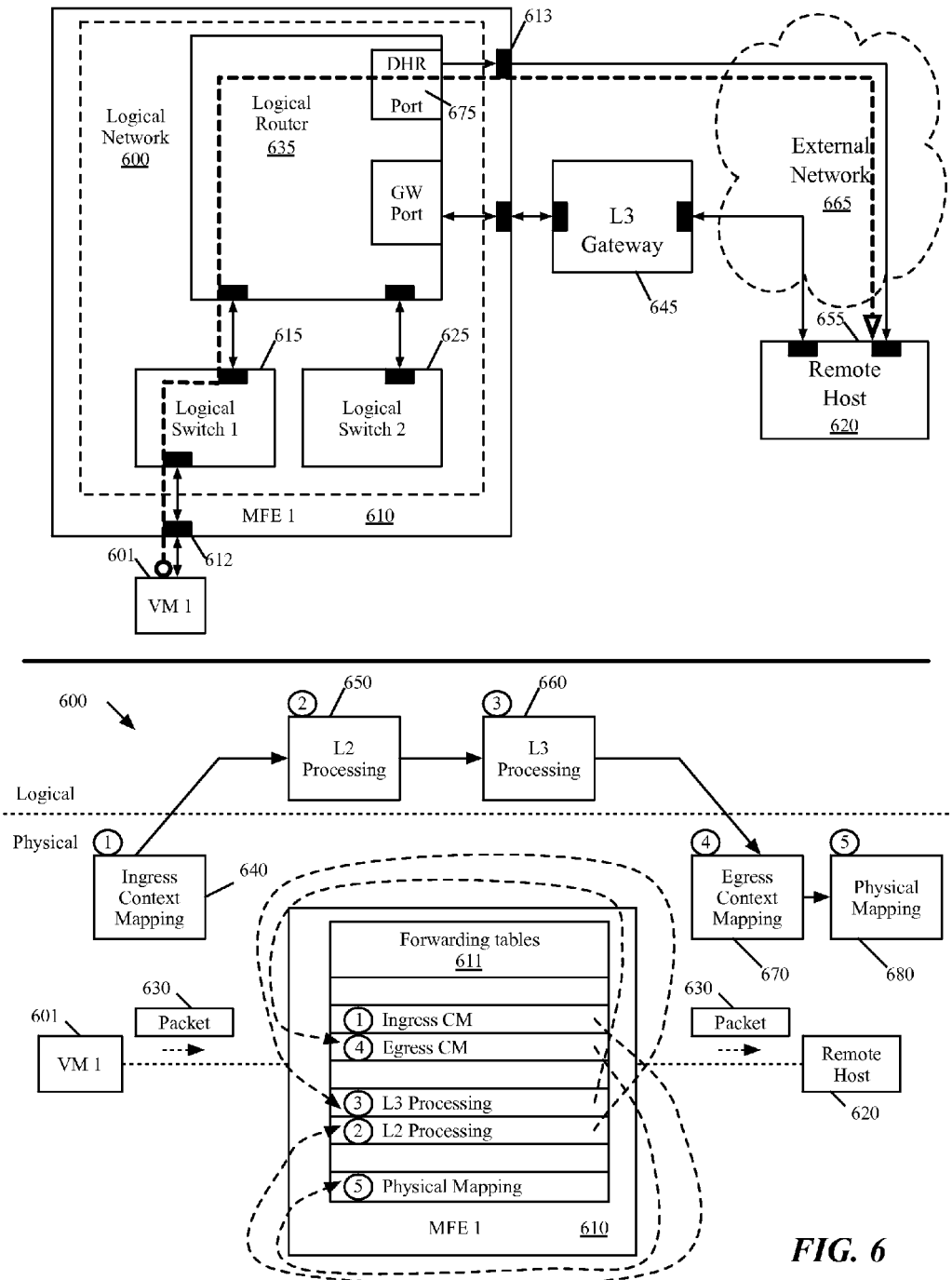
FIG. 6 conceptually illustrates an example packet transmission from one entity on a managed network to a remote destination using a DHR port of some embodiments.

FIG. 6 conceptually illustrates an example transmission of a packet from a first virtual machine hosted on a first host to a remote destination using a DHR port. The packet is transmitted through a logical network that is implemented by managed forwarding elements hosted on several physical hosts. The managed forwarding elements implement the logical network using flow entries that define actions to be taken on packets and conditions under which to take those actions. Each flow entry corresponds to an operation in a logical processing pipeline for transmitting the packet through the logical network. The logical processing pipeline directs the managed forwarding element to transmit the packet to a remote destination outside of the managed network.

As shown in the top half of FIG. 6 this example demonstrates an example conceptual transmission of a packet 630 from VM 1 601 to remote destination 655 through the network 600. This transmission is conceptually illustrated by the dashed arrow beginning at the hollow circle over VM 1 601. To traverse the logical network, the packet 630 will have to pass through logical switch 1 615, logical router 635, and DHR port 675. Similar to the logical network 100 shown in FIG. 1 and the managed network 200 shown in FIG. 2, VM 1 601 is connected to managed forwarding element 1 610 on a host machine. As mentioned above, logical networks and logical forwarding elements are abstractions implemented by managed forwarding elements hosted on host machines. This figure illustrates the logical network conceptually shown within the managed forwarding element 1 610 traversed by the packet. In this case, because the packet 630 exits the logical network through the DHR port 675, it is not processed by any further managed forwarding elements implementing any logical forwarding elements after leaving managed forwarding element 1 610, unlike the previous examples.

The bottom half of FIG. 6 conceptually illustrates a logical processing pipeline 605 implemented by managed forwarding element 1 610 that will receive the packet 630 from VM 1 601, perform logical processing on packet 630, and then forward the packet to remote destination 655. Processing pipeline 605 illustrates the logical processing operations performed by managed forwarding element 610 before physically transmitting packet 630 to remote destination 655. This processing pipeline is implemented by the managed forwarding element 610 using flow entries in the forwarding table 611 of managed forwarding element 610. As described above, a flow entry contains actions to be taken on a packet (e.g., modifying, forwarding, or dropping a packet etc.) and conditions under which to take those actions (e.g., characteristics of incoming packets).

In some embodiments, each operation performed on a packet in the logical network is represented by one or more flow entries in the forwarding table 611. The managed forwarding element 610 checks the characteristics of the packet against the conditions of each flow entry in the forwarding table 611 and performs the actions dictated by the flow entry whose conditions match the characteristic of the packet. For simplicity, the process by a managed forwarding element of checking the packet against the flow entries and performing the indicated actions is referred to herein as "submitting" the packets to the forwarding table.

In some cases, the action of the flow entry may change the packet's 630 characteristics and direct the managed forwarding element 610 to resubmit the changed packet to the forwarding table 611 (e.g., when the actions include "sending" the packet to a dispatch port). In some embodiments, the managed forwarding element 610 (of FIG. 6) may submit the packet to the forwarding table 611 multiple times to implement a multi-operation logical processing pipeline.

In the illustrated example, the packet 630 is repeatedly resubmitted to forwarding table 611 to implement logical processing pipeline 605. As mentioned above, in some embodiments, the managed forwarding element 610 uses software elements called "dispatch ports" to resubmit a packet to the forwarding table 611. The managed forwarding element 610 repeatedly submits the packet 630 to logical forwarding table 611 until the managed forwarding element 610 determines that a flow entry dictates that the packet should be either dropped or forwarded to one or more physical egress ports (e.g., sent to another host machine or out of the network). This re-submission process is conceptually illustrated by the dashed re-circling arrows leading from the right side of forwarding table 611 to the left side of forwarding table 611. Forwarding table 611 is a single table of flow entries. However, in some embodiments, managed forwarding elements use multiple forwarding tables instead of a single forwarding table.

Initially, managed forwarding element 610 receives packet 630 from VM 1 601 at a physical ingress port 612 of the managed forwarding element 610. The managed forwarding element 610 stores an indicator of the physical ingress port 612 of the packet in a temporary storage on the managed forwarding element 610 (e.g., a register). The managed forwarding element 610 then begins processing the packet 630 by attempting to match the packet's characteristics to conditions of flow entries in forwarding table 611.

At the first stage 640 of processing pipeline 605, the managed forwarding element 610 identifies a flow entry indicated by an encircled 1 (referred to as "flow entry 1") in the forwarding table that implements ingress context mapping. This identification is based on fields stored in a header of packet 630 and data for the packet (e.g., physical ingress port) that has been stored in registers on the managed forwarding element 610. Flow entry 1 then maps the stored physical ingress port to a logical ingress port on logical switch 615. Flow entry 1 also assigns the packet 630 a logical context. At this stage, the assigned logical context will be the logical ingress port of the particular logical switch. In some embodiments, the assigned logical context will include information indicating the packet's status within a logical network. The flow entry 1 also specifies that the packet 630 should be sent to a dispatch port (i.e., resubmitted to the forwarding table 611 by managed forwarding element 610) as illustrated by the curved dashed arrows leading from flow entry 1 to flow entry 2.

At the second stage 650 of processing pipeline 605, the managed forwarding element 610 identifies a flow entry indicated by an encircled 2 (referred to as "flow entry 2") in the forwarding table. Based on flow entry 2, the managed forwarding element 610 implements the L2 processing that corresponds to the forwarding actions of logical switch 1 615 in logical network 600. This identification is based on the logical context and/or other fields stored in the header of packet 630. In some embodiments, the L2 processing includes several flow entries followed by resubmits and includes performing ingress ACL functions before the switching decision and egress ACL functions after the switching decision. If a packet fails to pass the ingress ACL or the egress ACL, then the packet will be dropped. In this case, the L2 processing of stage 650 results in the packet 630 being "forwarded" from logical switch 1 615 to logical router 635 based on the destination MAC address of the packet corresponding to the egress port of the logical switch 615 that attaches to the logical router. In some embodiments, the managed forwarding element stores this forwarding decision in the packet registers. The flow entry 2 also specifies that the packet should be re-submitted to the forwarding table 611 (e.g., by sending the packet 630 to a dispatch port, as conceptually illustrated by the curved dashed arrows leading from flow entry 2 to flow entry 3).

At the third stage 660 of processing pipeline 605, the managed forwarding element 610 identifies a flow entry indicated by an encircled 3 (referred to as "flow entry 3") in the forwarding table that implements the logical L3 processing of the packet. The managed forwarding element 610 uses flow entry 3 to implement the L3 processing of the stage 660 that corresponds to the forwarding actions of logical router 635 in logical network 600. As in the previous cases, this stage may involve several flow entries, e.g. to perform L3 ingress ACL, logical L3 forwarding, and L3 egress ACL. In this case, the L3 processing of stage 660 results in the packet 630 being logically forwarded to DHR port 675 of the logical router 635. That is, the L3 processing identifies the DHR port 675 as the logical egress port of the logical router 635 for the packet 630. In addition, flow entry 3 specifies to resubmit the packet to the dispatch port of the managed forwarding element 610 for additional processing in order to effectuate this logical forwarding decision.

Different embodiments may use different routing entries to identify when packets should be forwarded to the DHR port. In some embodiments, certain statically-specified prefixes, either of the destination IP address or source IP address, are forwarded to the DHR port. For instance, some embodiments base the decision on (i) the destination IP address of the packet not matching any of the subnets served by the other logical router ports and (ii) the source IP address of the packet matching a subnet that sends packets to external networks through the DHR port 675 (and therefore through a direct connection to an external network that does not involve processing by any additional managed forwarding elements). This may be implemented by having higher-priority flow entries that forward packets by destination IP address to the other logical router ports (i.e., to the various logical switches), and then lower-priority flow entries that forward packets based on the source IP address to the DHR port. Thus, the lower-priority DHR flow entry will be matched only if the packet is not first sent to a logical switch. In some embodiments, the decision to send a packet to the DHR port may be based on the destination IP address of the packet matching a particular address or range of addresses. For example, the flow entries might specify that specific subnets should always be accessed through the DHR port, and therefore packets matching the prefix for one of these subnets are sent to the DHR port.

In the fourth stage 670 of processing pipeline 605, the managed forwarding element 610 identifies, based on the logical egress port identified in the previous stage, a flow entry indicated by an encircled 4 (referred to as "flow entry 4") in the forwarding table 611. The managed forwarding element 610 uses the flow entry to implement egress context mapping. In both of the previous examples, the logical egress port mapped to a different managed forwarding element (another forwarding element in a VM host in the first example, and a L3 gateway in the second example). However, in this case, the DHR port 675 does not map to a managed forwarding element.

Instead, in some embodiments, the DHR port maps to an IP stack of the host, as far as the managed forwarding element is concerned. That is, the flow entries stored in the managed forwarding element 610 do not view the DHR port 675 as mapping to an external network or a particular remote destination, but rather as mapping to an IP stack that stores its own routing table and will handle the packet after it leaves the managed forwarding element (and the managed network). Thus, the physical egress port 613 is a virtual interface between the managed forwarding element 610 and the IP stack of the host machine on which the managed forwarding element resides.

At the fifth stage 680 of processing pipeline 605, the managed forwarding element 610 identifies a flow entry indicated by an encircled 5 (referred to as "flow entry 5") in the forwarding table. The managed forwarding element 610 uses flow entry 5 to implement the physical mapping of the stage 680. In this case, rather than tunneling the packet to another managed forwarding element, the managed forwarding element simply strips any logical context from the packet, and drops the packet to the IP stack via the interface with this IP stack.

The IP stack routes the packet 630 based on its own routing tables. In some embodiments, these are static routing tables preconfigured by a network administrator to send packets to a particular physical router of the external network. The IP stack then directs the packet 630 to the Network Interface Controller (hereinafter "NIC") of the host without any encapsulation (e.g., without a logical context relating to the logical network and without any tunneling encapsulation).

Unlike the examples discussed above, there are no further logical processing operations at any other managed forwarding elements after managed forwarding element 610 passes the packet 630 to the IP stack of the host. Having discussed several examples of forwarding packets in managed networks that have DHR ports, an example architecture of a managed forwarding element of some embodiments will now be described.

II. Managed Forwarding Element Architecture

Figure 7:
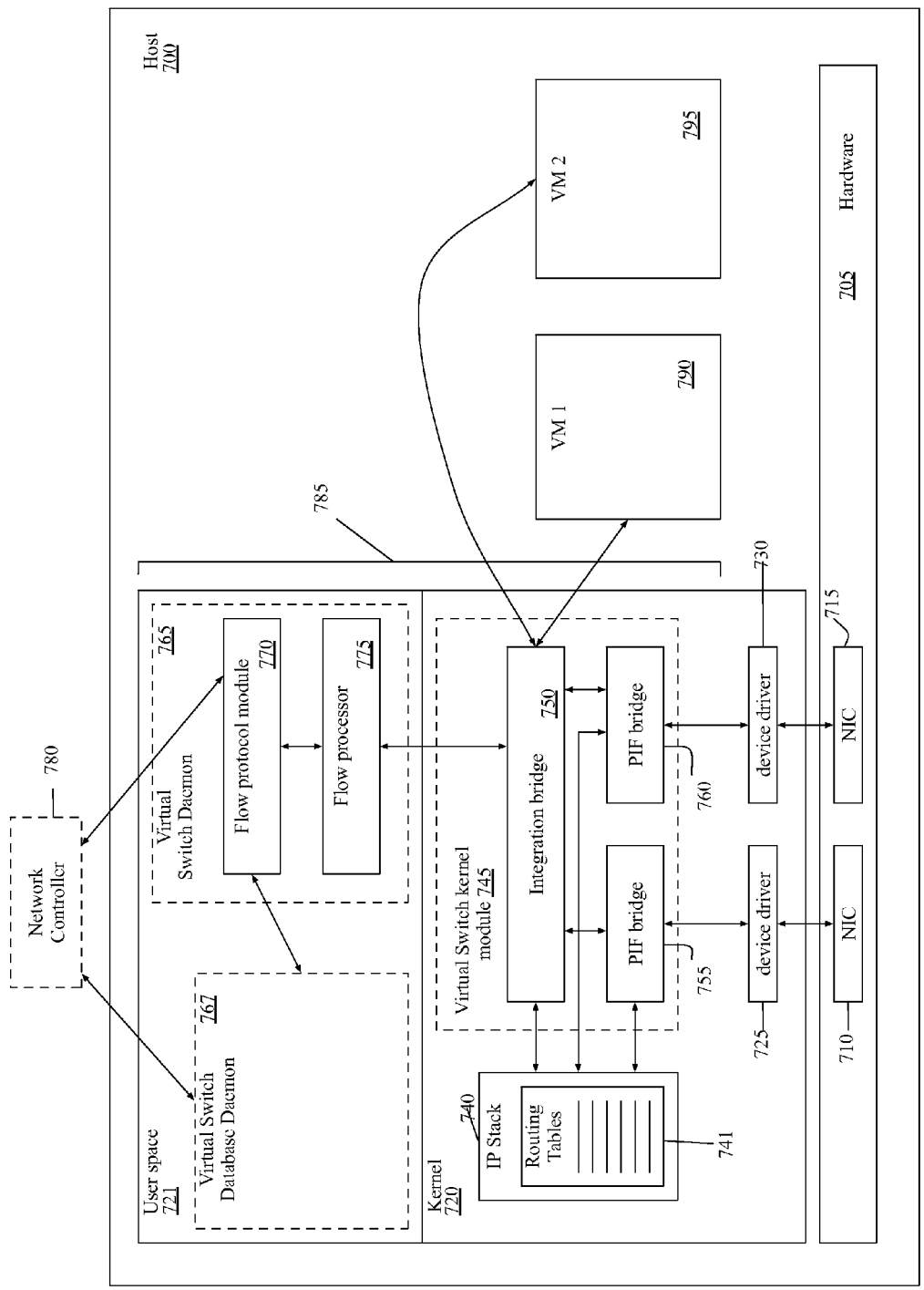
FIG. 7 conceptually illustrates an architecture of a managed forwarding element of some embodiments.

FIG. 7 conceptually illustrates an architectural diagram of a managed forwarding element of some embodiments that is implemented as a software switching element (e.g., Open Virtual Switch) in a host 700. The software switching element is implemented within virtualization software 785. In this example, the software switching element includes three components—a virtual switch kernel module 745, which runs in the kernel 720 of the virtualization software 785, and a virtual switch daemon 765 and a virtual switch database daemon 767, which run in the user space 721 of the virtualization software 785. While FIG. 7 illustrates the software switching elements as two components for the purpose of explanation, the virtual switch kernel module 745, the virtual switch daemon 765, and the virtual switch database daemon 767 collectively form the software switching element implemented within the virtualization software 785. Accordingly, the virtual switch kernel module 745, the virtual switch daemon 765, and the virtual switch database daemon 767 may be referred to as the software switching element and/or the virtual switch in the description of FIG. 7. In some embodiments, the virtualization software 785 collectively represents software sued to virtualize the resources of the host machines (e.g., a hypervisor, virtual machine monitor, etc.)

As illustrated in FIG. 7, the host 700 includes hardware 705, kernel 720, user space 721, virtualization software 785, and VMs 790-795. The hardware 705 may include typical computer hardware, such as processing units, volatile memory (e.g., random access memory (RAM)), non-volatile memory (e.g., hard disk drives, flash memory, optical discs, etc.), network adapters, video adapters, or any other type of computer hardware. As shown, the hardware 705 includes NICs 710 and 715, which in some embodiments are typical network interface controllers for connecting a computing device to a network.

As shown in FIG. 7, the host machine 700 includes a kernel 720 and a user space 721. In some embodiments, the kernel 720 is the most basic component of an operating system that runs on a separate memory space and is responsible for managing system resources (e.g., communication between hardware and software resources). In contrast, the user space 721 is a memory space where all user mode applications may run.

The kernel 720 of some embodiments is a software abstraction layer that runs on top of the hardware 705 and runs below any operating system. In some embodiments, the kernel 720 performs virtualization functionalities (e.g., to virtualize the hardware 705 for several virtual machines operating on the host machine). The kernel 720 is then part of a hypervisor, in some embodiments. The kernel 720 handles various management tasks, such as memory management, processor scheduling, or any other operations for controlling the execution of the VMs 790 and 795 operating on the host machine.

As shown, the kernel 720 includes device drivers 725 and 730 for the NICs 710 and 715, respectively. The device drivers 725 and 730 allow an operating system (e.g., of a virtual machine) to interact with the hardware of the host 700. In this example, the device driver 725 allows interaction with the NIC 710, while the driver 730 allows interaction with the NIC 715. The kernel 720 may include other device drivers (not shown) for allowing the virtual machines to interact with other hardware (not shown) in the host 700.

The virtual machines 790 and 795 are independent virtual machines running on the host machine 700, using resources virtualized by the kernel 720. As such, the VMs run any number of different operating systems. Examples of such operations systems include Solaris, FreeBSD, or any other type of Unix-based operating system. Other examples include Windows-based operating systems as well.

As shown, the user space 721 of the virtualization software 785 includes the virtual switch daemon 765 and the virtual switch database daemon 767. Other applications (not shown) may be included in the user space 721 of the virtualization software 785 as well. The virtual switch daemon 765 is an application that runs in the background of the user space 721 of the virtualization software 785. Some embodiments of the virtual switch daemon 765 communicate with a network controller 780 in order to process and route packets that the virtualization software 785 receives. For example, the virtual switch daemon 765 receives commands from the network controller 780 regarding operations for processing and routing packets that the virtualization software 785 receives. The virtual switch daemon 765 communicates with the network controller 780 through the flow protocol. In some embodiments, the flow protocol is the Openflow protocol, while in other embodiments; another type of communication protocol is used. Additionally, some embodiments of the virtual switch daemon 765 receive configuration information from the virtual switch database daemon 767 to facilitate the processing and routing of packets.

In some embodiments, the virtual switch database daemon 767 is also an application that runs in the background of the user space 721 of the virtualization software 785. The virtual switch database daemon 767 of some embodiments communicates with the network controller 780 in order to configure the virtual switching element (e.g., the virtual switch daemon 765 and/or the virtual switch kernel module 745). For instance, the virtual switch database daemon 767 receives configuration information from the network controller 780 for configuring DHR ports, ingress ports, egress ports, QoS configurations for ports, etc., and stores the configuration information in a set of databases. In some embodiments, the virtual switch database daemon 767 communicates with the network controller 780 through a database communication protocol (e.g., a JavaScript Object Notation (JSON) remote procedure call (RPC)-based protocol). In some embodiments, another type of communication protocol is utilized. In some cases, the virtual switch database daemon 767 may receive requests for configuration information from the virtual switch daemon 765. The virtual switch database daemon 767, in these cases, retrieves the requested configuration information (e.g., from a set of databases) and sends the configuration information to the virtual switch daemon 765.

The network controller 780 is similar to the various network controllers described in this application, such as the ones described by reference to FIG. 2. That is, the network controller 780 manages and controls the software switching element running on the virtualization software 785 of the host 700.

FIG. 7 also illustrates that the virtual switch daemon 765 includes an flow protocol module 770 and a flow processor 775. The flow protocol module 770 communicates with the network controller 780 through the flow protocol. For example, the flow protocol module 770 receives configuration information from the network controller 780 for configuring the software switching element. Configuration information may include flows that specify rules (e.g. flow entries) for processing and routing packets. When the flow protocol module 770 receives configuration information from the network controller 780, the flow protocol module 770 may translate the configuration information into information that the flow processor 775 can understand. In some embodiments, the flow protocol module 770 is a library that the virtual switch daemon 765 accesses for some or all of the functions described above.

The flow processor 775 manages the rules for processing and routing packets. For instance, the flow processor 775 stores rules (e.g., in a storage medium, such as a disc drive) that the flow processor 775 receives from the flow protocol module 770 (which, in some cases, the flow protocol module 770 receives from the network controller 780). In some embodiments, the rules are stored as a set of forwarding tables that each includes a set of flow entries (also referred to collectively as "configured flow entries"). As noted above, flow entries specify operations for processing and/or routing network data (e.g., packets) based on routing criteria. In addition, when the flow processor 775 receives commands from the flow protocol module 770 to remove rules, the flow processor 775 removes the rules.

In some embodiments, the flow processor 775 supports different types of rules. For example, the flow processor 775 of such embodiments supports wildcard rules and exact match rules. In some embodiments, an exact match rule is defined to match against every possible field of a particular set of protocol stacks. A wildcard rule is defined to match against a subset of the possible fields of the particular set of protocol stacks. As such, different exact match rules and wildcard rules may be defined for different set of protocol stacks.

The flow processor 775 handles packets for which integration bridge 750 does not have a matching rule. For example, the flow processor 775 receives packets from the integration bridge 750 that does not match any of the rules stored in the integration bridge 750. In such cases, the flow processor 775 matches the packets against the rules stored in the flow processor 775, which include wildcard rules as well as exact match rules. When a packet matches an exact match rule or a wildcard rule, the flow processor 775 sends the exact match rule or the wildcard rule and the packet to the integration bridge 750 for the integration bridge 750 to process.

In some embodiments, when a packet matches a wildcard rule, the flow processor 775 generates an exact match rule based on the wildcard rule to which the packet matches. As mentioned above, a rule, in some embodiments, specifies an action to perform based on a qualifier. As such, in some embodiments, the generated exact match rule includes the corresponding action specified in the wildcard rule from which the exact match rule is generated.

In other embodiments, when a packet matches a wildcard rule, the flow processor 775 generates a wildcard rule that is more specific than the wildcard rule to which the packet matches. Thus, in some embodiments, the generated (and more specific) wildcard rule includes the corresponding action specified in the wildcard rule from which the exact match rule is generated.

In some embodiments, the flow processor 775 may not have a rule to which the packet matches. In such cases, some embodiments of the flow process 775 send the packet to the network controller 780 (through the flow protocol module 770). However, in other cases, the flow processor 775 may have received from the network controller 780 a catchall rule that drops the packet when a rule to which the packet matches does not exist in the flow processor 775.

After the flow processor 775 generates the exact match rule based on the wildcard rule to which the packet originally matched, the flow processor 775 sends the generated exact match rule and the packet to the integration bridge 750 for the integration bridge 750 to process. This way, when the integration bridge 750 receives a similar packet that matches generated the exact match rule, the packet will be matched against the generated exact match rule in the integration bridge 750 so the flow processor 775 does not have to process the packet.

Some embodiments of the flow processor 775 support rule priorities for specifying the priority for a rule with respect to other rules. For example, when the flow processor 775 matches a packet against the rules stored in the flow processor 775, the packet may match more than one rule. In these cases, rule priorities may be used to specify which rule among the rules to which the packet matches that is to be used to match the packet.

The flow processor 775 of some embodiments is also responsible for managing rules in the integration bridge 750. As explained in further detail below, the integration bridge 750 of some embodiments stores only active rules. In these embodiments, the flow processor 775 monitors the rules stored in the integration bridge 750 and removes the active rules that have not been access for a defined amount of time (e.g., 1 second, 3 seconds, 5, seconds, 10 seconds, etc.). In this manner, the flow processor 775 manages the integration bridge 750 so that the integration bridge 750 stores rules that are being used or have recently been used.

Although FIG. 7 illustrates one integration bridge, the virtual switch kernel module 745 may include multiple integration bridges. For instance, in some embodiments, the virtual switch kernel module 745 includes an integration bridge for each logical forwarding element that is implemented across a managed network to which the software switching element belongs. That is, the virtual switch kernel module 745 has a corresponding integration bridge for each logical forwarding element that is implemented across the managed network. For instance, in the example managed network 200 shown in FIG. 2, managed forwarding element 215 would maintain an integration bridge for each of logical forwarding elements 270 (e.g., LS 1, LS 2, LR), and any further logical forwarding elements (e.g., forwarding elements for other logical networks)

As illustrated in FIG. 7, the kernel 720 includes a Internet Protocol (IP) stack 740 and a virtual switch kernel module 745. In some embodiments, the IP stack 740 is a hypervisor network stack that runs on the virtualization software 785. The IP stack 740 processes and routes IP packets that are received from the virtual switch kernel module 745 and the PIF bridges 755 and 760. When processing a packet that is destined for a network host external to the host 700, the IP stack 740 determines to which of physical interface (PIF) bridges 755 and 760 the packet is to be sent. The IP stack 740 may make such determination by examining the destination IP address of the packet and a set of routing tables 741.

The IP stack 740 further performs certain operations in forwarding packets that have been sent out from a DHR port. As mentioned above in connection with FIG. 6, when a packet has a logical egress port corresponding to a DHR port, the packet is dropped to the IP stack 740. In some embodiments, the DHR logical egress port is an abstraction attached to a logical forwarding elements being running on an integration bridge 750. When the IP stack 740 receives the packet, the IP stack 740 will route the packet using forwarding tables 741. In some embodiments, forwarding tables 741 are maintained by the host machine that hosts the IP stack 740. In routing the packet, the IP stack 740 looks up the MAC address of the next-hop and sends the packet to the proper physical NIC unencapsulated. In some embodiments, NIC 710 or NIC 715 can be the proper physical NIC. When the packet is transmitted to the next-hop (e.g., using an ARP table), its source MAC address will be that of physical NIC. In some embodiments, when a logical forwarding element has a DHR port added, the routing table 741 associated with the host of the logical forwarding element is automatically or manually populated with a connected route to the intended remote destination. In some embodiments, when the IP stack 740 has finished processing a packet received from a DHR logical egress port, the IP stack then directly sends the packet it has finished processing to NIC 710 or NIC 715 without sending the packet back to a PIF bridge or an integration bridge.

The virtual switch kernel module 745 processes and routes network data (e.g., packets) between VMs running on the host 700 and network hosts external to the host 700 (i.e., network data received through the NICs 710 and 715). For example, the virtual switch kernel module 745 of some embodiments routes packets between VMs running on the host 700 and network hosts external to the host 700 (e.g., when packets are not routed through a tunnel) through a set of patch ports (not shown) that couple the virtual switch kernel module 745 to the PIF bridges 755 and 760. In several of the figures in this application (e.g., FIGS. 4-6), forwarding tables are illustrated as part of a forwarding plane of a software switching element. However, the forwarding tables may be conceptual representations and may be implemented by the virtual switch kernel module 745, in some embodiments.

To facilitate the processing and routing of network data, the virtual switch kernel module 745 communicates with virtual switch daemon 765. For example, the virtual switch kernel module 745 receives processing and routing information (e.g., flow entries) from the virtual switch daemon 765 that specifies how the virtual switch kernel module 745 is to process and route packets when the virtual switch kernel module 745 receives packets. Some embodiments of the virtual switch kernel module 745 include a bridge interface (not shown) that allows the IP stack 740 to send packets to and receiving packets from the virtual switch kernel module 745. In other embodiments, the IP stack 740 sends packets to and receives packets from the bridges included in virtual switch kernel module 745 (e.g., integration bridge 750 and/or PIF bridges 755 and 760).

FIG. 7 illustrates that the virtual switch kernel module 745 includes an integration bridge 750 and the PIF bridges 755 and 760. The integration bridge 750 processes and routes packets received from the IP stack 740, the VMs 790 and 795 (e.g., through VIFs), and the PIF bridges 755 and 760. In some embodiments, a set of patch ports is directly connects two bridges. The integration bridge 750 of some such embodiments is directly coupled to each of the PIF bridges 755 and 760 through a set of patch ports. In some embodiments, the integration bridge 750 receives packets from the IP stack 740 through a default hypervisor bridge (not shown) that handles packet processing and routing. However, in such embodiments, a function pointer (also referred to as a bridge hook) that instructs the hypervisor bridge to pass packets to the integration bridge 750 is registered with the hypervisor bridge.

In some embodiments, the set of rules that the integration bridge 750 stores are only exact match rules. The integration bridge 750 of some such embodiments stores only active exact match rules, which are a subset of the rules stored in the flow processor 775 (and/or rules derived from rules stored in the flow processor 775) that the integration bridge 750 is currently using or was recently using to process and route packets. The integration bridge 750 of some embodiments stores a set of rules (e.g., flow entries) for performing mapping lookups and logical forwarding lookups. Some embodiments of the integration bridge 750 may also perform standard layer 2 packet learning and routing.

In some embodiments, the virtual switch kernel module 745 includes a PIF bridge for each NIC in the hardware 705. For instance, if the hardware 705 includes four NICs, the virtual switch kernel module 745 would include four PIF bridges for each of the four NICs in the hardware 705. In other embodiments, a PIF bridge in the virtual switch kernel module 745 may interact with more than one NIC in the hardware 705.

The PIF bridges 755 and 760 route network data between the IP stack 740 and network hosts external to the host 700 (i.e., network data received through the NICs 710 and 715). As shown, the PIF bridge 755 routes network data between the IP stack 740 and the NIC 710 and the PIF bridge 760 routes network data between the IP stack 740 and the NIC 715. The PIF bridges 755 and 760 of some embodiments perform standard layer 2 packet learning and routing. In some embodiments, the PIF bridges 755 and 760 performs physical lookups/mapping.

In some embodiments, the virtualization software 785 provides and controls the PIF bridges 755 and 760. However, the network controller 780 may, in some embodiments, control the PIF bridges 755 and 760 (via the virtual switch daemon 765) in order to implement various functionalities (e.g., quality of service (QoS)) of the software switching element.

In several of the figures in this application (e.g., FIGS. 4-6), forwarding tables are illustrated as part of a forwarding plane of a software switching element. However, these forwarding tables may be, in some embodiments, conceptual representations that can be implemented by the virtual switch kernel module 745. In some embodiments, a managed forwarding element is implemented by the virtual switch daemon 765 and the virtual switch kernel module 745.

The architectural diagram of the software switching element and the host illustrated in FIG. 7 is one exemplary configuration. One of ordinary skill in the art will recognize that other configurations are possible. For instance, some embodiments may include several integration bridges in the virtual switch kernel module 745, additional NICs and corresponding PIF bridges, and additional VMs.

The following will describe an exemplary operation of the virtual switching element illustrated in FIG. 7 according to some embodiments of the invention. Specifically, a packet processing operation performed by the virtual switching element will be described. As described above, the virtual switch kernel module 745 processes packets and routes packets. The virtual switch kernel module 745 can receive packets in different ways. For instance, the virtual switch kernel module 745 can receive a packet from the VM 790 or the VM 795 through the VM's VIF. In particular, the virtual switch kernel module 745 receives the packet from the VM 790 or the VM 795 at the integration bridge 750.

Furthermore, the virtual switch kernel module 745 can receive a packet from a network host external to the host 700 through one of the NICs 710 and 715, the NIC's corresponding PIF bridge (i.e., PIF bridge 725 or PIF bridge 730), and the IP stack 740. Examples of such external hosts are shown in FIG. 2, namely the other host devices 210 or 220, the gateway providers 250, or potentially the physical network element 230 if virtualization software 785 is being executed on one of the gateway providers 250. The IP stack 740 then sends the packets to the integration bridge 750 of the virtual switch kernel bridge 745. In some cases, the packet is received from a network host external to the host 700 through a tunnel. In some embodiments, the tunnel terminates at the IP stack 740. Thus, when the IP stack 740 receives the packet through the tunnel, the IP stack 740 unwraps (i.e., decapsulates) the tunnel header and determines, based on the tunnel information (e.g., tunnel ID), which integration bridge of the virtual switch kernel module 745 to which to send the unwrapped packet. As mentioned above, the virtual switch kernel module 745 of some embodiments may include an integration bridge for each logical forwarding element that is implemented across the managed network to which the virtual switching element belongs. Accordingly, the IP stack 740 determines the logical forwarding element to which the tunnel belongs, identifies the integration bridge that corresponds to the determined logical forwarding element, and sends the packet to the identified integration bridge.

In addition, the virtual switch kernel module 745 can receive a packet from a network host external to the host 700 through one of the NICs 710 and 715, the NIC's corresponding PIF bridge (i.e., PIF bridge 725 or PIF bridge 730), and a set of patch ports (not shown) that couple the PIF bridge to the virtual switch kernel module 745. As noted above, the virtual switch kernel module 745 of some embodiments may include an integration bridge for each logical forwarding element that is implemented across the managed network to which the virtual switching element belongs. Accordingly, the NIC's corresponding PIF bridge determines the logical forwarding element to which the tunnel belongs, identifies the integration bridge that corresponds to the determined logical forwarding element, and sends the packet to the identified integration bridge.

When the integration bridge 750 receives a packet in any of the manners described above, the integration bridge 750 processes the packet and routes the packet. As noted above, some embodiments of the integration bridge 750 stores only active exact match rules, which are a subset of the rules stored in the flow processor 775 (and/or rules derived from rules stored in the flow processor 775) that the integration bridge 750 is currently using or was recently using to process and route packets. The integration bridge 750 performs a lookup based on a set of fields in the packet's header (e.g., by applying a hash function to the set of fields). In some embodiments, the set of fields may include a field for storing metadata that describes the packet. If the lookup returns a rule to which the packet matches, the integration bridge 750 performs the action (e.g., forward the packet, drop the packet, reprocess the packet, etc.) specified in the rule. However, if the lookup does not return a rule, the integration bridge 750 sends the packet to the flow processor 775 to process.

As explained above, the flow processor 775 handles packets for which the integration bridge 750 does not have a matching rule. When the flow processor 775 receives the packet from the integration bridge 750, the flow processor 775 matches the packet against the rules stored in the flow processor 775, which include wildcard rules as well as exact match rules. When a packet matches an exact match rule, the flow processor 775 sends the exact match rule and the packet to the integration bridge 750 for the integration bridge 750 to process. When a packet matches a wildcard rule, the flow processor 775 generates an exact match rule based on the wildcard rule to which the packet matches, and sends the generated exact match rule and the packet to the integration bridge 750 for the integration bridge 750 to process.

Although FIG. 7 illustrates the virtualization software 785 as a virtual machine, different embodiments may implement the virtualization software 785 differently. In such embodiments, the virtualization software 785 performs the same or similar functions as those described above with respect to the virtualization software 785. Having discussed a virtual switch of some embodiments, a discussion regarding how network controllers of some embodiments configure managed forwarding elements will follow below.

III. Configuring MFES to Use DHR Ports

Figure 8:
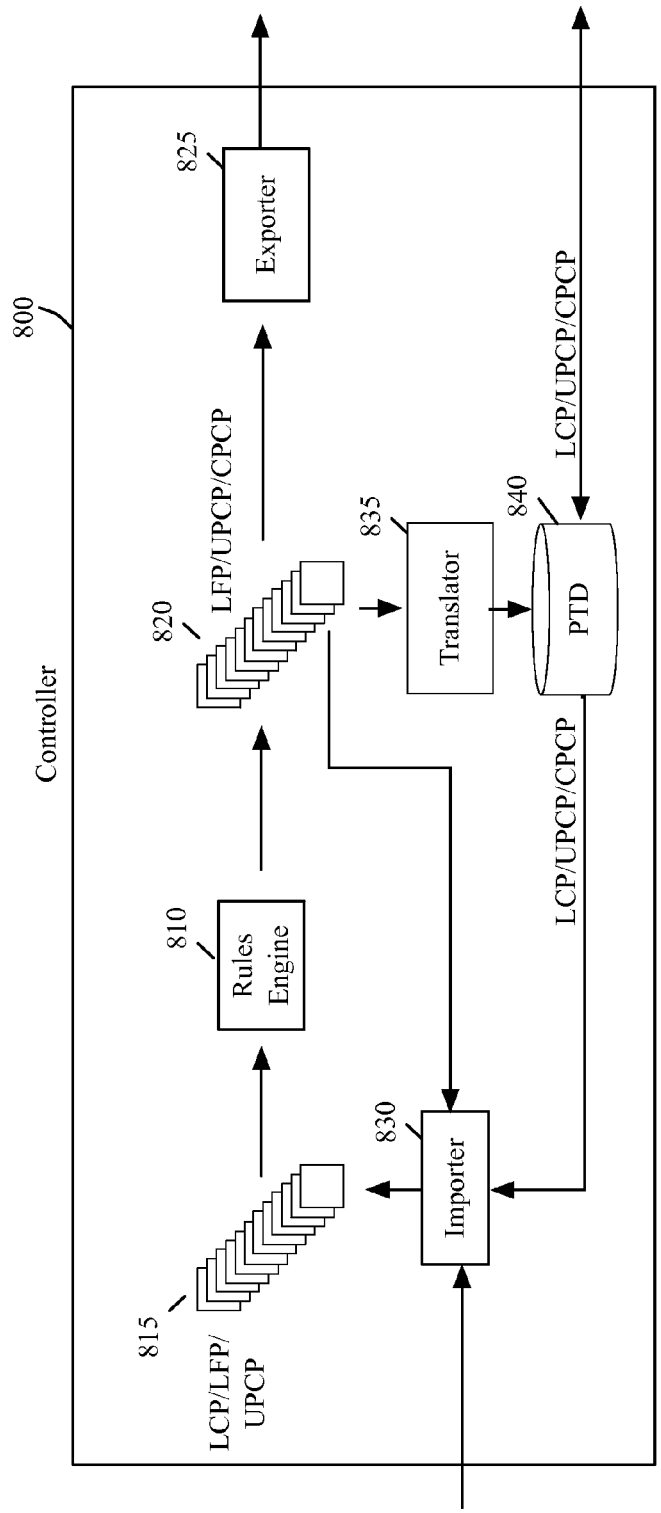
FIG. 8 illustrates an architecture of a network controller of some embodiments.

The above figures illustrate various physical and logical network controllers. FIG. 8 illustrates example architecture of a network controller (e.g., a logical controller or a physical controller) 800. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The network controller 800, as shown, includes input tables 815, a rules engine 810, output tables 820, an importer 830, an exporter 835, a translator 835, and a persistent data storage (PTD) 840.

In some embodiments, the input tables 815 include tables with different types of data depending on the role of the controller 800 in the network control system. For instance, when the controller 800 functions as a logical controller for a user's logical forwarding elements, the input tables 815 include LCP data and LFP data for the logical forwarding elements. When the controller 800 functions as a physical controller, the input tables 815 include LFP data.

In addition to the input tables 815, the control application 800 includes other miscellaneous tables (not shown) that the rules engine 810 uses to gather inputs for its table mapping operations. These miscellaneous tables include constant tables that store defined values for constants that the rules engine 810 needs to perform its table mapping operations (e.g., the value 0, a dispatch port number for resubmits, etc.). The miscellaneous tables further include function tables that store functions that the rules engine 810 uses to calculate values to populate the output tables 825.

The rules engine 810 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 810 includes an event processor (not shown), several query plans (not shown), and a table processor (not shown). Each query plan is a set of rules that specifies a set of join operations that are to be performed upon the occurrence of an input table event. The event processor of the rules engine 810 detects the occurrence of each such event. In some embodiments, the event processor registers for callbacks with the input tables for notification of changes to the records in the input tables 815, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 820.

Some embodiments use a variation of a datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 815, the output tables 820 include tables with different types of data depending on the role of the controller 800. When the controller 800 functions as a logical controller, the output tables 815 include LFP data and UPCP data for the logical switching elements. When the controller 800 functions as a physical controller, the output tables 820 include CPCP data. The output tables 815 may include a slice identifier when the controller 800 functions as a physical controller.

In some embodiments, the output tables 820 can be grouped into several different categories. For instance, in some embodiments, the output tables 820 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 825 to export the change to another controller or a managed forwarding element. An output table can be an RE input table, a RE output table, or both an RE input table and a RE output table.

The exporter 825 detects changes to the RE output tables of the output tables 820. In some embodiments, the exporter registers for callbacks with the RE output tables for notification of changes to the records of the RE output tables. In such embodiments, the exporter 825 detects an output table event when it receives notification from a RE output table that one of its records has changed.

In response to a detected output table event, the exporter 825 takes each modified data tuple in the modified RE output tables and propagates this modified data tuple to one or more other controllers or to one or more managed forwarding elements. When sending the output table records to another controller, the exporter in some embodiments uses a single channel of communication (e.g., a RPC channel) to send the data contained in the records. When sending the RE output table records to managed forwarding elements, the exporter in some embodiments uses two channels. One channel is established using a switch control protocol (e.g., OpenFlow) for writing flow entries in the control plane of the managed forwarding element. The other channel is established using a database communication protocol (e.g., JSON) to send configuration data (e.g., port configuration, tunnel information).

In some embodiments, the controller 800 does not keep in the output tables 820 the data for logical datapath sets that the controller is not responsible for managing (i.e., for logical networks managed by other logical controllers). However, such data is translated by the translator 835 into a format that can be stored in the PTD 840 and is then stored in the PTD. The PTD 840 propagates this data to PTDs of one or more other controllers so that those other controllers that are responsible for managing the logical datapath sets can process the data.

In some embodiments, the controller also brings the data stored in the output tables 820 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 830 interfaces with a number of different sources of input data and uses the input data to modify or create the input tables 810. The importer 820 of some embodiments receives the input data from another controller. The importer 820 also interfaces with the PTD 840 so that data received through the PTD from other controller instances can be translated and used as input data to modify or create the input tables 810. Moreover, the importer 820 also detects changes with the RE input tables in the output tables 830.

In some embodiments, a single layer of network controller (either a single network controller or a network controller cluster) communicates directly with the managed forwarding elements (e.g., the edge forwarding elements, the pool node(s), and the extender(s)). However, in other embodiments, several layers of network controllers process and generate flow entries in the network control system. For example, in some embodiments, each logical datapath set (i.e., each logical forwarding element) is assigned to a single logical (higher-level) network controller. This logical controller receives logical control plane (LCP) data and converts the LCP data into logical forwarding plane (LFP) data. The logical controller also subsequently converts the LFP data into universal physical control plane (UPCP) data.

In some embodiments, the UPCP data is published by the logical controller to a second level of network controller (referred to as a physical controller). In some embodiments, different physical controllers manage different physical forwarding elements (e.g., edge forwarding elements, pool nodes, gateways, etc.). Furthermore, the physical controller of some embodiments converts the UPCP data into customized physical control plane (CPCP) data. In other embodiments, however, the physical controller passes the UPCP data to a conversion mechanism operating at the forwarding element itself (referred to as a chassis controller).

The LCP data, in some embodiments, describes the logical network topology (e.g., as a set of bindings that map addresses to logical ports). In some embodiments, the LCP data is expressed as a set of database table records (e.g., in the nLog language). An entry in the control plane describing the attachment of a particular virtual machine to the network might state that a particular MAC address or IP address is located at a particular logical port of a particular logical switch. In some embodiments, the LFP data derived from the LCP data consists of flow entries described at a logical level. That is, a flow entry might specify that if the destination of a packet matches a particular IP address, to forward the packet to the logical port to which the IP address is bound.

The translation from LFP to physical control plane (PCP) data, in some embodiments, adds a layer to the flow entries that enables a managed forwarding element provisioned with the flow entries to convert packets received at a physical layer port (e.g., a virtual interface) into the logical domain and perform forwarding in this logical domain. That is, while traffic packets are sent and received within the network at the physical layer, the forwarding decisions are made according to the logical network topology entered by the user. The conversion from the LFP to the PCP enables this aspect of the network in some embodiments.

As mentioned, the logical controller converts the LFP data into the UPCP, which is subsequently converted to CPCP data. The UPCP data of some embodiments is a data plane that enables the control system of some embodiments to scale even when it contains a large number of managed forwarding elements (e.g., thousands) to implement a logical datapath set. The UPCP abstracts common characteristics of different managed forwarding elements in order to express PCP data without considering differences in the managed forwarding elements and/or location specifics of the managed forwarding elements. The UPCP to CPCP translation involves a customization of various data in the flow entries. While the UPCP entries are applicable to any managed forwarding element because the entries include generic abstractions for any data that is different for different forwarding elements, the CPCP entries include substituted data specific to the particular managed forwarding element to which the entry will be sent (e.g., specific tunneling protocols, virtual and physical interface, etc.).

Figure 9:
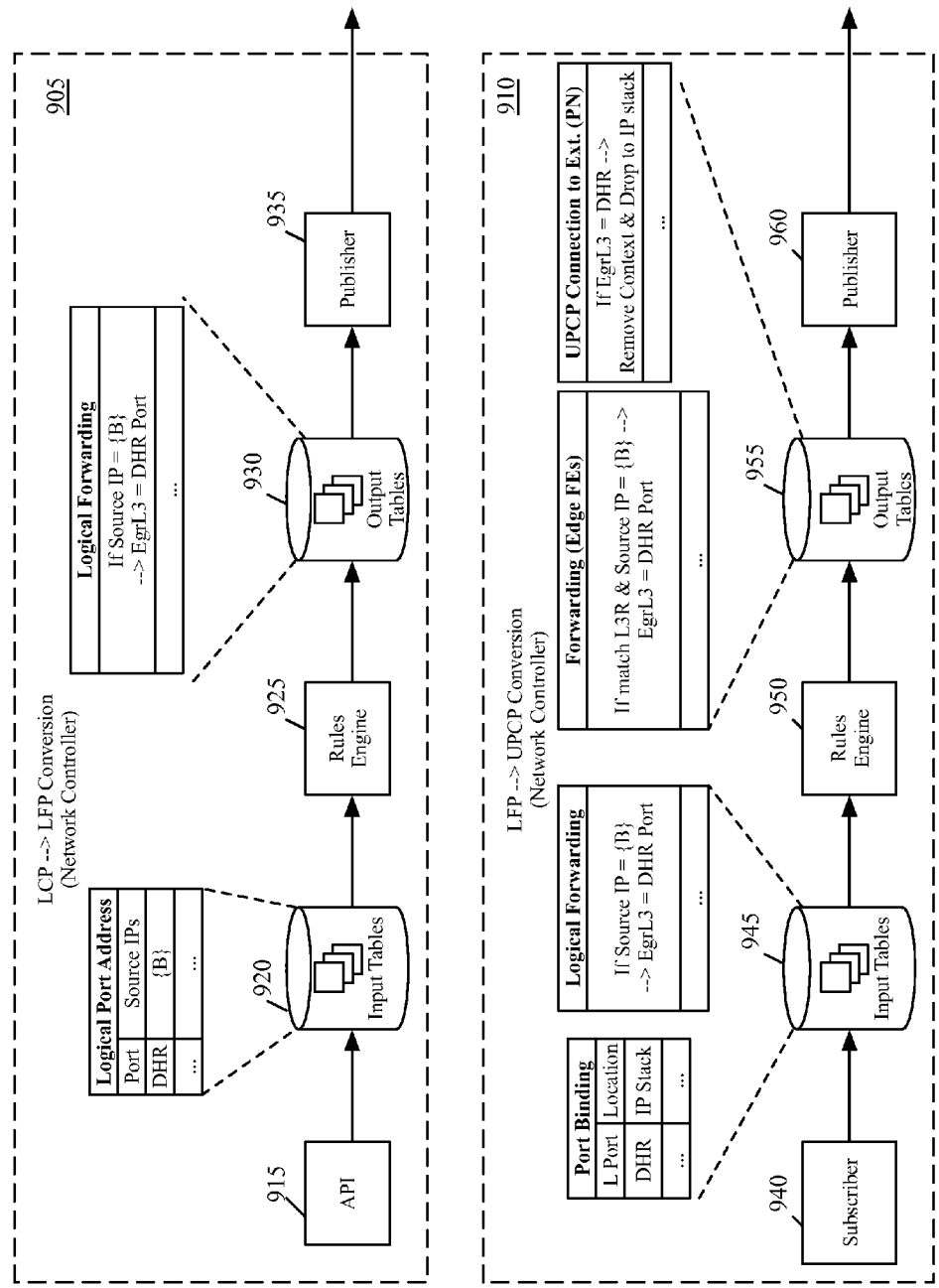
FIG. 9 conceptually illustrates a conversion from logical control plane data to universal physical control plane data performed at a network controller of some embodiments.

FIG. 9 conceptually illustrates the conversions from LCP data to UPCP data performed at the logical controller of some embodiments, by showing input and output tables for each of these conversions. In some embodiments, these input and output tables are nLog tables. In some embodiments, the LCP to LFP conversion is performed by a control application, while the LFP to UPCP conversion is performed by a virtualization application. As shown, the control application 905 includes an application programming interface (API) 915, input tables 920, a rules engine 925, output tables 930, and a publisher 935.

The API 915 provides an interface for translating input into the control plane input tables 920. This API 915 may be used by various types of management tools with which a user (e.g., a network administrator for a particular tenant) can view/and or modify the state of a logical network (in this case, the logical network that spans both the data center and the tenant's remote site). In some embodiments, the management tools provide a user interface such as a graphical user interface that allows a visual configuration of port bindings, ACL rules, etc. (e.g., through a web browser). Alternatively, or in conjunction with the graphical user interface, some embodiments provide the user with a command line tool or other type of user interface.

Based on the information received through the API, as well as updates to the network state received from the managed forwarding elements (not shown), the control application generates the input tables 920. The input tables represent the state of the logical forwarding elements managed by the user in some embodiments. In some embodiments, the input tables will include the binding of destination IP addresses (or destination subnets) to logical ports of a logical router. However, the DHR port will be handling traffic for remote destinations that have IP addresses unknown to the controller in some embodiments (e.g., an end user sending a request for a web page). Thus, in some embodiments, the routing to the DHR port is performed based on source IP addresses (e.g., particular subnets). In other cases, the routing to the DHR port is performed based on destination IP addresses, or based on a combination of source and destination IP addresses. Generally, in some embodiments a static route in a routing table forwards certain IP address prefixes (source and/or destination) to the DHR port.

Therefore, as shown in this figure, some of the input tables 920 include the bindings of IP addresses to the DHR ports. Specifically, this example illustrates the binding of certain source IP addresses to the DHR port. An additional input table would bind known destination IP addresses (e.g., the different subnets of the logical network) to their own logical ports in some embodiments. In other examples, a set of destination IP addresses would be bound to the DHR port. Furthermore, for a single logical router definition, both source and IP addresses could be bound to the DHR port.

In some embodiments, the input tables to the LCP to LFP conversion may also include bindings of MAC addresses with logical ports (for L2 logical forwarding), as well as ACL rules set by the user. In the case shown in FIG. 9, the logical port DHR is associated with certain source IP addresses (e.g., certain subnets, individual IPs, etc.), which include a set of IP addresses {B}. The logical port DHR is an example of a DHR port of some embodiments.

The rules engine 925 of some embodiments performs various combinations of database operations on different sets of input tables 920 to populate and/or modify different sets of output tables 930. In the example shown in FIG. 9, output tables 930 include an entry that directs a managed forwarding element to assign an L3 egress port of a packet to be the DHR port when the packet's source IP address is in the set {B} (e.g., one of the subnets that forwards packets through the DHR port rather than the gateways). Some embodiments additionally require that the destination IP address be unknown so that packets sent from one of the subnets that forwards packets through the DHR port to one of the other logical switches that attaches to the logical router will not be sent to the DHR port. In other embodiments, the flow entries for sending these packets to the DHR port have a lower priority, so that the MFE implementing the logical router will only send a packet to the DHR port if the source address is in the range {B} and the packet has not already been forwarded to a logical switch. When the DHR port is bound to a set of destination IP addresses, the output tables include an entry that directs a managed forwarding element to assign the L3 egress port of a packet to be the DHR port when the packet's destination IP is in that set of addresses.

As described in further detail in U.S. Patent Publication 2013/0058350, incorporated herein by reference, in some embodiments the rules engine is an nLog table mapping engine that maps a first set of nLog tables into a second set of nLog tables. The output tables 930 populated by the rules engine 925 include logical forwarding plane lookups (e.g., mapping the set of IP addresses to a destination output port).

The publisher 935 is also described in further detail in U.S. Patent Publication 2013/0058350, and publishes or sends the output tables 930 to the virtualization application 910, in order for this application to use the output tables 930 among its input tables. In some embodiments, the publisher 935 also outputs the tables to a data structure (e.g., a relational database) that stores network state information.

The virtualization application 910 receives the output tables 930 (LFP data) of the control application 905, and converts this data to UPCP data. As shown, the virtualization application 910 includes a subscriber 940, input tables 945, a rules engine 950, output tables 955, and a publisher 960. The subscriber 940 of some embodiments is responsible for retrieving tables published by the publisher 935. In some embodiments, the subscriber 940 retrieves these tables from the same data structure to which the publisher stores the table information. In other embodiments, a change in the tables is detected by the conversion modules in order to initiate the processing.

The input tables 945 include, in some embodiments, at least some of the output tables 930, in addition to other tables. As shown, in addition to the logical forwarding plane data generated by the control application 905, the input tables 945 include additional port binding information (matching logical ports with the universally unique identifier (UUID) of particular source or destination managed forwarding elements). The example port binding shows that the logical port DHR is bound to the IP stack (i.e., that packets sent to logical port DHR should be dropped to the IP stack). As mentioned above, input tables 945 includes tables from output tables 930. Accordingly, in FIG. 9, input tables 945 include the entry that directs a managed forwarding element to assign an L3 egress port of a packet to be the DHR port when the packet's source IP address is in the set {B}.

In some embodiments, the rules engine 950 is the same as the rules engine 925. That is, the control application 905 and the virtualization application 910 actually use the same rules engine in some embodiments. As indicated, the rules engine performs various combinations of database operations on different sets of input tables 945 to populate and/or modify different sets of output tables 955. In some embodiments, the rules engine is an nLog table mapping engine that maps a first set of nLog tables into a second set of nLog tables.

The output tables 955 populated by the rules engine 950 include different lookup entries for different managed forwarding elements. For instance, in some embodiments that perform all logical processing at the first hop (i.e., the edge forwarding element), the physical control plane entries implementing the logical forwarding element will be sent to the edge forwarding elements that might receive a packet destined for one of the machines at the remote tenant site without logical context and need to be able to perform logical forwarding to send the packet to the remote tenant site. In FIG. 9, the output tables 955 include an entry that directs managed forwarding elements to assign the L3 egress port of a packet to be the DHR port when the source IP address of the packet is in the set {B} and when the packet has matched the logical router that includes the particular DHR port (e.g., using information stored in the registers for the packet). As indicated above, in some embodiments this entry has a lower priority than other entries that route packets based on the destination IP address, so that effectively the flow entry is only matched and acted upon when the destination IP address is unknown to the implementation of the logical router. In other examples, when the DHR port is bound to a set of destination IP addresses, the output tables will include an entry that directs a managed forwarding element to assign the L3 egress port of a packet to be the DHR port when the destination IP address is in the bound range of IP addresses and when the packet has matched the logical router that includes the particular DHR port.

In addition, the UPCP will include entries that direct a managed forwarding element to map the L3 logical egress port of a packet to a physical port through which to send the packet. In this example, the output tables 955 include an entry directing a managed forwarding element to remove any logical context from a matching packet and transmit the matching packet to the IP stack for routing to a physical next-hop when the packet's L3 logical egress port is the DHR port. When the packet is transmitted to the next-hop, its source MAC address will be that of physical NIC that transmitted the packet.

The publisher 960 is similar to the publisher 935 in some embodiments. The publisher 960 publishes and/or sends the output tables 955 to the physical controllers. In some cases, certain flow entries (e.g., the entry shown for the edge forwarding elements) may be sent to multiple different physical controllers while other entries are sent to only one physical controller. In some embodiments, the publisher 960 outputs the tables to a data structure (e.g., a relational database) that stores network state information.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
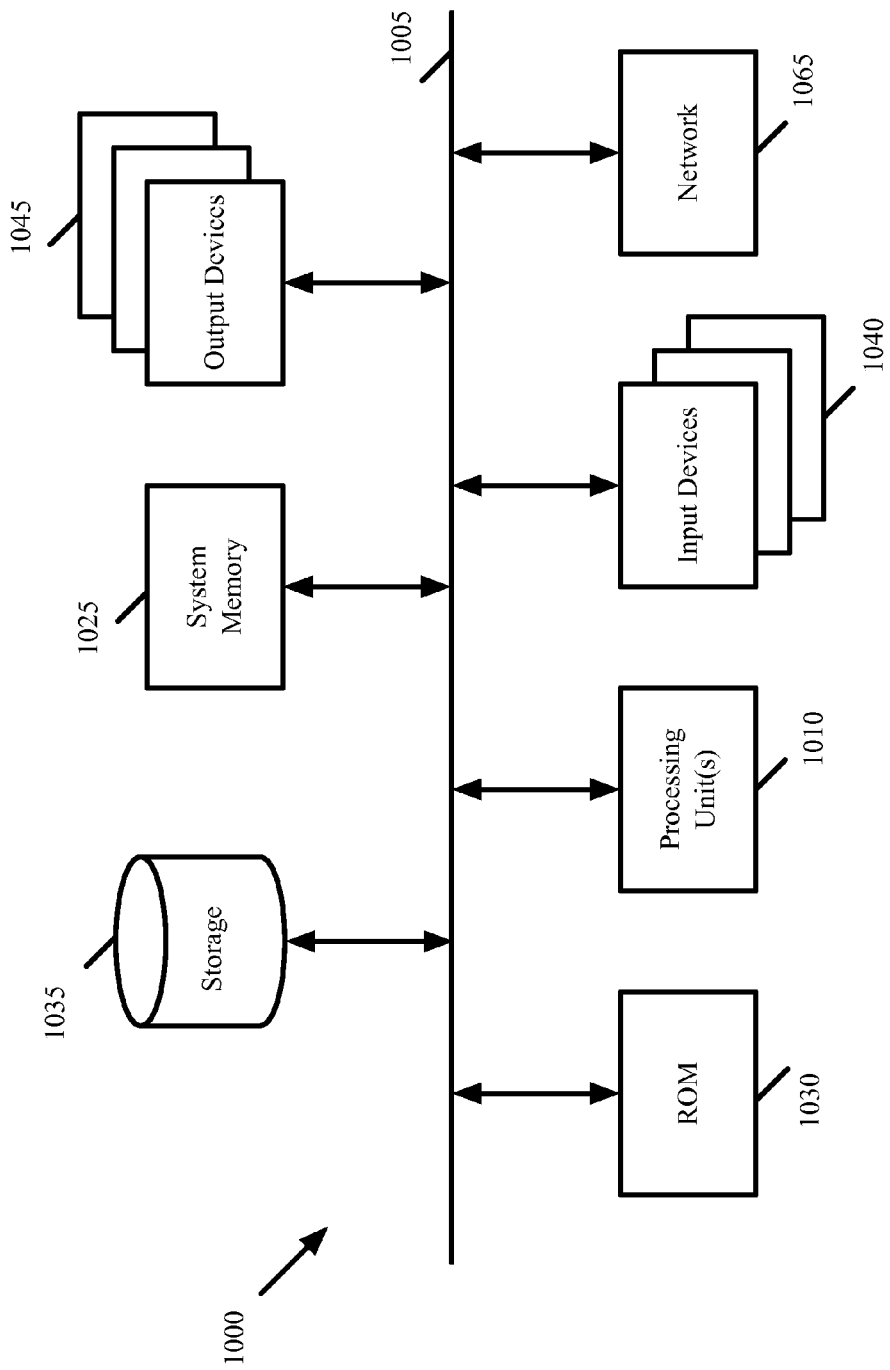
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, host machine, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method for managing a network for a network controller the method comprising:

configuring a first managed forwarding element in the network, operating in a host machine that hosts a virtual machine belonging to a particular logical network and connected to the managed network through the first managed forwarding element, to implement a first logical port of a logical router of the particular logical network, the first logical port used only for egress traffic directed outside of the managed network, the first managed forwarding element implementing the first logical port by connecting directly to a physical network element outside of the managed network in order to send egress traffic directly to the physical network element without the egress traffic passing through any intervening managed forwarding elements in the managed network; and configuring a second managed forwarding element in the managed network to implement a second logical port of the logical router, the second logical port used for both ingress traffic received from outside the managed network and egress traffic directed outside the managed network, wherein the second managed forwarding element receives ingress traffic addressed to the first virtual machine directly from the physical network element and transmits said ingress traffic to the first managed forwarding element.

2. The method of claim 1, wherein the second managed forwarding element is a gateway that handles ingress and egress traffic between the managed network and the external network.

3. The method of claim 1, wherein the first managed forwarding element only receives ingress traffic sent by the physical network element and addressed to the first virtual machine from the second managed forwarding element.

4. The method of claim 1, wherein the physical network element is a router.

5. A non-transitory machine readable medium storing a program which when executed by at least one processing unit of a host machine implements a first managed forwarding element to implement a logical network in a managed network, the program comprising sets of instructions for:

receiving a first packet from a second managed forwarding element, wherein the second managed forwarding element received the first packet from a particular source through a physical network element outside of the managed network and performed logical processing on the first packet as having received the first packet at a first logical port of a logical router, the first logical port used for both ingress traffic received from outside the managed network and egress traffic directed outside the managed network;

transmitting the first packet from the first managed forwarding element to a virtual machine hosted at the host machine;

receiving a second packet from the virtual machine, wherein the second packet has a destination address of the particular source of the first packet;

performing logical processing on the second packet to logically send the packet to a second logical port of the logical router that is used only for egress traffic directed outside of the managed network; and based on the logical processing, transmitting the second packet directly from the first managed forwarding element to the physical network element via a connection, to which the second logical port of the logical router maps, between the host machine and the physical network element that does not include any intervening managed forwarding elements.

6. The non-transitory machine readable medium of claim 5, wherein the logical network implemented by the first managed forwarding element comprises a logical switch to which the virtual machine connects and the logical router with two logical ports for traffic between the virtual machine and an external network behind which the particular source is located, wherein the logical network is implemented by managed forwarding elements on several physical host machines.

7. The non-transitory machine readable medium of claim 5, wherein the second managed forwarding element implements a logical gateway of the logical network, wherein the logical gateway acts as a means of egress from the managed network to an external network and a means of ingress to the managed network from the external network.

8. The non-transitory machine readable medium of claim 5, wherein the host machine hosts a plurality of virtual machines connecting to a plurality of different logical networks.

9. The non-transitory machine readable medium of claim 5, wherein the physical network element is a router.

10. The non-transitory machine readable medium of claim 5, wherein the set of instructions for transmitting the second packet directly to the physical network element comprises a set of instructions for sending the second packet from the first managed forwarding element to an IP stack of the host machine, wherein the IP stack comprises a routing table that sends the packet to the physical network element.

11. The non-transitory machine readable medium of claim 10, wherein the routing table is configured with static routes.

12. A method for a managed forwarding element that operates in a host machine to implement a logical network within a managed network, the method comprising:

at the first managed forwarding element, receiving a first packet from a second managed forwarding element, wherein the second managed forwarding element received the first packet from a particular source through a physical network element outside of the managed network and performed logical processing on the first packet as having received the first packet at a first logical port of a logical router, the first logical port used for both ingress traffic received from outside the managed network and egress traffic directed outside the managed network;

transmitting the first packet from the first managed forwarding element to a virtual machine hosted at a host machine;

at the first managed forwarding element, receiving a second packet from the virtual machine, wherein the second packet has a destination address of the particular source of the first packet;

performing logical processing on the second packet to logically send the packet to a second logical port of the logical router that is used only for egress traffic directed outside of the managed network; and based on the logical processing, transmitting the second packet directly from the first managed forwarding element to the physical network element via a connection, to which the second logical port of the logical router maps, between the host machine and the physical network element that does not include any intervening managed forwarding elements.

13. The method of claim 12, wherein the logical network implemented by the first managed forwarding element comprises a logical switch to which the virtual machine connects and the logical router with two logical ports for traffic between the virtual machine and an external network behind which the particular source is located.

14. The method of claim 13, wherein the logical router includes a third logical port to which the logical switch connects.

15. The method of claim 14, wherein the second managed forwarding element performed logical processing on the first packet by identifying the second logical port as a logical ingress port for the first packet and using a destination address of the first packet to identify the third logical port that corresponds to the logical switch as a logical egress port of the logical router for the first packet.

16. The method of claim 14, wherein performing logical processing on the second packet comprises:
identifying the third logical port as a logical ingress port of the logical router for the second packet; and
identifying the second logical port as a logical egress port of the logical router for the second packet based on (i) a destination address of the second packet not mapping to any subnet connected to the logical router and (ii) a source address of the second packet matching a set of source addresses that use the second logical port for egress traffic,
wherein transmitting the second packet comprises, based on the identification of the logical egress port of the logical router, removing logical information from the second packet and sending the packet to an IP stack that operates on the host machine.

17. The method of claim 16, wherein the IP stack comprises routing tables for routing the second packet to the physical network element.

18. The method of claim 12, wherein the second managed forwarding element operates on a host machine that does not host virtual machines and provides L3 gateways for several logical networks.

19. The method of claim 12, wherein the logical network is implemented by a plurality of managed forwarding elements on a plurality of different host machines that each receive packets from sources outside the managed network via the second managed forwarding element and transmit packets to the sources outside the managed network directly via connections between the host machines and the physical network element.

20. The method of claim 12, wherein communication between the virtual machine and the particular source is initiated by the virtual machine.

21. The method of claim 12, wherein communication between the virtual machine and the particular source is initiated by the particular source.

* * * * *